United States Patent
Siaud

(10) Patent No.: US 8,811,315 B2
(45) Date of Patent: Aug. 19, 2014

(54) METHOD AND A DEVICE FOR TRANSMISSION WITH TIME-FREQUENCY MAPPING OF SYMBOLS IN SUB-CHANNELS

(75) Inventor: Isabelle Siaud, Rennes (FR)

(73) Assignee: Orange, Paris (FR)

( * ) Notice: Subject to any disclaimer, the term of this patent is extended or adjusted under 35 U.S.C. 154(b) by 22 days.

(21) Appl. No.: 13/254,005

(22) PCT Filed: Mar. 30, 2010

(86) PCT No.: PCT/FR2010/050584
§ 371 (c)(1),
(2), (4) Date: Aug. 31, 2011

(87) PCT Pub. No.: WO2010/112754
PCT Pub. Date: Oct. 7, 2010

(65) Prior Publication Data
US 2011/0317651 A1    Dec. 29, 2011

(30) Foreign Application Priority Data

Mar. 31, 2009    (FR) ...................................... 09 52074

(51) Int. Cl.
*H04W 72/04*    (2009.01)
(52) U.S. Cl.
USPC ........................................................ 370/329

(58) Field of Classification Search
CPC ...................................................... H04W 72/04
USPC .................................. 370/329; 709/201–213
See application file for complete search history.

(56) References Cited

U.S. PATENT DOCUMENTS

| 7,969,957 | B2 * | 6/2011 | Naka et al. ..................... 370/343 |
| 8,483,295 | B2 * | 7/2013 | Tamaki et al. ................. 375/260 |
| 2005/0265469 | A1 | 12/2005 | Aldana et al. |
| 2006/0203935 | A1 * | 9/2006 | Li et al. ......................... 375/299 |
| 2009/0022237 | A1 | 1/2009 | Wang et al. |

FOREIGN PATENT DOCUMENTS

| FR | 2 880 483 A1 | 7/2006 |
| WO | WO 2008/087351 A2 | 7/2008 |

* cited by examiner

*Primary Examiner* — Ayaz Sheikh
*Assistant Examiner* — Debebe Asefa
(74) *Attorney, Agent, or Firm* — Drinker Biddle & Reath LLP

(57) ABSTRACT

A method is provided for mapping data symbols at the input of a multi-carrier modulator, which data symbols are interleaved in blocks of K symbols, into sub-channels of size equal to $N_{SDC}$ consecutive carriers scattered to one or more multi-carrier symbols, $N_{SDC}$ being a sub-multiple of K. The size $N_{SDC}$ of the sub-channels is determined as a function of a symbol interleaving pattern diversity between sub-channels.

17 Claims, 11 Drawing Sheets

Fig. 11a      Fig. 11b

METHOD AND A DEVICE FOR TRANSMISSION WITH TIME-FREQUENCY MAPPING OF SYMBOLS IN SUB-CHANNELS

CROSS-REFERENCE TO RELATED APPLICATIONS

This application is the U.S. national phase of the International Patent Application No. PCT/FR2010/050584 filed Mar. 30, 2010, which claims the benefit of French Application No. 09 52074 filed Mar. 31, 2009, the entire content of which is incorporated herein by reference.

FIELD OF THE INVENTION

The present invention relates to the field of telecommunications. Within this field, the invention relates more particularly to so-called "digital" communications. Digital communications comprise in particular wireless communications; but, for example, they also include wired communications. A communications transmission medium is commonly referred to as a transmission or propagation channel, originally as a reference to a channel over the air and by extension with reference to any channel.

BACKGROUND

The invention relates to techniques of mapping symbols in sub-channels distributed over one or more multi-carrier symbols, typically orthogonal frequency division multiplexing (OFDM). Such techniques are generally implemented with a multi-user access technique, e.g. of the orthogonal frequency division multiple access (OFDMA) type.

The invention applies in particular to any type of multiple carrier transmission system. FIG. 1 shows a conventional transceiver system described in baseband for such a system SYS that comprises a transmitter EM and a receiver RE. The output signal from the transmitter is conveyed by a propagation channel CH to the receiver RE. The transmission system comprises an error correcting coder CC, a symbol binary coder CBS, a mapping module MT, and an OFDM modulator. In conventional manner, the transmission system further comprises a module for inserting a guard interval (not shown) at the output from the OFDM modulator. The receiver system comprises an OFDM demodulator, $OFDM^{-1}$ (conventionally preceded by a module for eliminating the guard interval), a de-mapping module $MT^{-1}$, an equalizer module EG, a symbol binary decoder $CBS^{-1}$, and an error correcting decoder $CC^{-1}$.

The information coming from a source Sce is coded using a so-called error correcting code by means of the coder CC (the coded data is optionally punctured in order to increase the bit rate). The data is then put into the form of data symbols Sd (quadrature amplitude modulation (QAM), quadrature phase shift keying (QPSK), . . . cells) by the CBS modulator that performs symbol binary coding. The mapping module maps the data symbols at the input to the OFDM modulator which generates OFDM symbols Sm. Symbol mapping may be decomposed into data symbols being segmented into sub-channels and into scattering the sub-channels in time and/or frequency over one or more OFDM symbols. The mapping module may also insert pilot symbols into each sub-channel or into some of the sub-channels in order to perform OFDM equalization on reception from the received pilots. The insertion of pilot symbols may be accompanied by the insertion of an OFDM preamble. The OFDM modulator generates OFDM symbols by means of an inverse Fourier transform.

An OFDM modulator comprises an array of sub-carriers that correspond to frequency subdivisions of the instantaneous band of the transmission system. The OFDM modulator performs modulation of the symbols (data, pilots, null symbols designated by guard carriers) on the sub-carriers that correspond to the conjugate Fourier components of a Fourier transform of size $N_{FFT}$ that corresponds to the number of sub-carriers of the OFDM modulator.

The transmission channel Ch is also referred to as a multi-path channel and is represented by the impulse response $h(t,\tau)$ of a digital filter where t represents the time variable and $\tau$ represents the delay variable associated with the filter coefficients at instant t. The transmission channel filters the multi-carrier signal by weighting each symbol allocated to the carrier k by the corresponding component of the transfer channel function decomposed over the OFDM multiplex made up of $N_{FFT}$ components. On reception it generates a correlation of the sub-carriers in the frequency and the time domains. The frequency correlation affects the sub-carriers and the time correlation induces sub-carriers of quasi-constant amplitude over an observation window of the order of the coherence time of the channel. The coherence time corresponds to the mean value of the time difference needed to ensure decorrelation of the signal representative of the transmission medium with respect to its time-shifted version.

These two correlations limit the performance of decision circuits on reception. The time correlation gives rise to error bursts after making decisions concerning transmitted data symbols and after decoding estimated transmitted bits. These effects are encountered when the environment varies slowly and is a multi-path environment. This applies in particular for ultra-wide band systems as defined by the standard ECMA-368 "High rate ultra-wideband PYH and MAC standard", $3^{rd}$ edition, December 2008, for radio systems dedicated to the local radio loop (Wimax defined by the standard IEEE 802.16e; Air interface for fixed and mobile broadband wireless access systems; IEEE P802.16e/D12 Draft, October 2005, Digital enhanced cordless telecommunications (DECT) defined by the standard ETSI EN 300 175-3 Digital enhanced cordless telecommunications (DECT); Common interface (CI); Part 3: Medium access control (MAC) layer; or for transmissions of the xDSL type.

The frequency correlation results simultaneously from the multi-path effect that produces filtering, from the Doppler effect, and from the phase noise of the radio frequency (RF) stages that give rise to a loss of orthogonality between the sub-carriers of an orthogonal multiplex. This applies in particular to so-called ultra-wideband short-range systems and to systems defined in the millimetric band such as those studied by the American Standards Organization IEEE 802.15.3c, and also 4G radio systems (LTE advanced, Wi-Max) having a high level of mobility, or very long range systems dedicated to ionospheric radio connections (the digital radio mondiale (DRM) system, standard ETSI TS 101 980).

As shown in FIG. 2, a known method of remedying this double correlation consists in implementing binary interleaving ETB on transmission that is performed on the binary data, and/or symbol interleaving ETS that is performed on the data symbols Sd.

The interleaving techniques in a transmission system are thus applied to the data in order to decorrelate the received data and improve the decision circuits.

Interleaving is said to be "binary" interleaving when it applies to code bits or indeed to bits extracted directly from the source, with this being referred to as "scrambling".

Interleaving is said to be "symbol" interleaving or a method of allocating symbols by carriers when it applies to complex symbols (QPSK, x-QAM, . . . ) allocated to the sub-carriers of a multi-carrier modulator. Its size is generally equal to the number $N_{SD}$ of data symbols per multi-carrier modulator or is a multiple of $N_{SD}$. This type of interleaving occurs upstream from the multi-carrier modulator. In equivalent manner it is common to refer to carrier or sub-carrier interleaving.

The mapping of symbols at the input to the OFDM modulator may be implemented in different ways as a function of the system.

In general, an OFDM system may be associated with an access technique. In particular, an OFDMA method consists in allocating data symbols to carriers of a given OFDM symbol, which data symbols are associated with different users or different groups of data symbols. Under such circumstances, the mapping of the data symbols of one or more users consists in grouping them together in sub-channels of individual size $N_{SDC}$ and then in distributing those sub-channels in time and in frequency in such a manner as to mix different users within a single OFDM symbol. An illustration of this is given in FIG. 3 where the sub-channels are built up by allocating a symbol of each group to each sub-channel. The number of sub-channels as built up in this way corresponds to the number of symbols per group, i.e. $N_{SC}$, and the size of a sub-channel corresponds to the number of groups taken into consideration, i.e. $N_{SDC}$. The number of sub-channels per OFDM symbol depends on the number $N_{SD}$ of data symbols per OFDM symbol and on the size $N_{SDC}$ of a sub-channel.

The implementation of a prior art system shown in FIGS. 4, 5, 6, and 7 relates to a system in compliance with the standard IEEE 802.16e. The specifications taken into consideration of the standard have the references "Air interface for fixed and mobile broadband wireless access systems and Corrigendum 1", IEEE P802.16e/IEEE Std 802.16e-2005—approved Dec. 7, 2005, IEEE Std 802.16-2004/Cor 1—2005—approved Nov. 8, 2005. A system in compliance with that standard is commonly referred to as a "Wimax" system. The term "Wimax" also covers the Hyperman standard.

The standard IEEE 802.16e defines an individual unit known as "OFDMA slot S1_unit", which is constituted by one or more sub-channels distributed in time over one or more consecutive OFDMA symbols. The frequency unit corresponds to the size of a sub-channel, $N_{SDC}$. This individual unit OFDMA slot is the minimum individual transmission unit corresponding to a given modulation and coding mode or scheme (MCS) for the corresponding data symbols that depends on the transmission mode (up path, down path, full usage of the sub-channels (FUSC) where all of the sub-channels are allocated to the transmitter, with the pilots and then the data sub-channels being inserted into the OFDMA frame), partial usage of the sub-channels (PUSC), where the number of sub-channel allocated may vary, with the pilots being inserted in the sub-channels, or being mapped after the mapping of the data in the sub-channels. An OFDMA slot is an individual pattern for scattering the data and optionally the pilots (PUSC mode in which the pilots are incorporated in fixed positions in the OFDMA slot, up connection only), for a given transmission mode. OFDMA slots corresponding to a given symbol modulation and coding mode (MCS) are distributed in the time frequency domain to form a data region (Dr) block. A Dr block thus corresponds to a two-dimensional transmission unit comprising a plurality of OFDMA slots using the same modulation and coding scheme (MCS). An individual OFDMA frame (Tre) made up of Nsymb OFDMA symbols (i.e. one or more symbols) is formed by scattering different Dr blocks in frequency and in time by order of increasing index in order to form complete OFDM symbols.

The Dr blocks forming an OFDMA symbol may correspond to different transmission modes (FUSC and PUSC), either in up link or in down link. The overall frame is shared between two distinct portions, for the up channel and for the down channel. An individual OFDMA frame is typically preceded by a preamble symbol for synchronizing or estimating the propagation channel on reception.

The allocation of pilots over the OFDM multiplex may precede the distribution of sub-channels J(sc), as applies with the down path of the standard IEEE 802.16e, or it may be incorporated therein using a pattern that is periodic relative to the OFDMA slot, as applies in the PUSC mode of the standard IEEE 802.16e.

With reference to FIG. 4, the data symbols Sd from a CBS symbol binary coding module or an interleaver ETS are segmented in sub-channels of individual size $N_{SDC}$, which sub-channels are scattered in time and in frequency in an OFDMA slot (S1_unit) by the mapping module MT. An OFDMA slot is made up of a plurality of sub-channels distributed in time over Nsymb0 consecutive OFDM symbols along the time scale, and over a sub-channel of size $N_{SDC}$ along the frequency scale. The OFDMA slots associated to the same MCS modulation and coding mode are grouped together by the mapping module MT in a Dr block formed by N'm sub-channels along the frequency scale and N'symb OFDM symbols along the time axis. N'symb is a multiple of Nsymb0. N Dr blocks are successively scattered in frequency and then in time in order to build up an individual OFDM frame Tre using the mapping module MT. An individual OFDM frame Tre is made up of Nsymb OFDM symbol corresponding to N Dr blocks. N'm is a sub-multiple of the number $N_{SC}$ of sub-channels per OFDM symbol, and N'symb depends on the transmission mode of the system under consideration.

The mapping method is described in detail below for the FUSC mode for the down channel and it is shown in FIG. 5.

The sub-channels of the down path in FUSC mode may be constituted by symbols coming from different groups. An OFDMA slot may thus be associated with a plurality of groups. For FUSC mode in the down path, adjacent data symbols are grouped together in $N_{SDC}$ groups of $N_{SC}$ data symbols. The segmentation in the sub-channels consists in allocating to a sub-channel a data symbol coming from each different group in application of a relationship that depends on the number of data symbols per OFDMA symbol, i.e. on the size of the Fourier transform of the OFDM transmission mode. The sub-channel is made up of $N_{SDC}$ data symbols from each group.

$N_{SC}$ channels are thus formed in which $N_{SC}$ corresponds to the number of data symbols per group. The pilots are scattered over the OFDM frame (OFDM multiplexer) in independent manner. The relationship for allocating data symbols to the sub-channels is a two-dimensional relationships in which Sc is the index of the sub-channel Sc={0,$N_{SC}$−1}, and k is the position index of the symbol in the sub-channel k={0,$N_{SDC}$−1}. The relationship $L_{DL\_FUSC}(k,Sc)$ provides, for the symbol at position k in sub-channel Sc, the origin position of the symbol upstream in the symbol interleaving ETS method in the data block formed by $N_{SDC} \times N_{SC}$ data symbols having indices 0 to $N_{SDC} \times N_{SC}$−1. The indices $s_c$ and k correspond to the position of the symbol in the sub-channel of index $s_c$ ($Y(k,s_c)=X(k'=L_{DL\_FUSC}(k,s_c))$).

The relationship for allocating data symbols in the sub-channels is given by:

$$L_{DL\_FUSC}(k,s_c)=Nsc \cdot n(k,s_c)+[Ps_c([n(k,s_c)]_{Nsc}+DL\_perm\_base)]_{N_{SC}}$$

$$n(k,s_c)=[k+13 \cdot s_c]_{N_{SDC}}$$

$$k'=L_{DL\_FUSC}(k,s_c), k'=\{0,\ldots N_{SDC} \times N_{SC}-1\},$$

$$k=\{0,N_{SDC}-1\}, sc=\{0,N_{SC}-1\}$$

$$Y(k,s_c)=X(L_{DL\_FUSC}(k,s_c))$$

where $Ps_c(k)$ is a bijective relationship corresponding to an interleaving pattern of size $N_{SC}$ described in the form of a vector of size $N_{SC}$ for k varying over the range 0 to $N_{SC}-1$. The relationship $Ps_c$ varies for each sub-channel under consideration of index $s_c$ and is the result of a left-hand circular rotation of $s_c$ derived from the basic allocation relationship referred to as "DL_perm_base". DL_perm_base is a vector of size $N_{SC}$ that makes the index k correspond to the position of the origin symbol $Ps_c(k)$.

The permutation relationships varies with the size of the Fourier transform of the OFDM modulation, and its size corresponds to the number of sub-channels per OFDMA symbol. The transmission parameters for the FUSC mode are given for different sizes of the Fourier transform in Table 1 of Appendix A. The size of the sub-channel is constant. It is dimensioned relative to the size of the frame, the bit rate, and the size of the OFDM symbol groups, and it is independent of the OFDM transmission mode (FFT size, bit rate).

FIG. 6 shows the allocation of data symbols in the sub-channels in application of the relationship $L_{DL\_FUSC}(k,s_c)$ for an FFT of size equal to 2048. The ordinate axis corresponds to the index $i_{Sd}$ of the data symbols in an OFDM symbol. The abscissa axis corresponds to the position index $i_{S/SC}$ of the symbol for a given sub-channel. This index varies from zero to $N_{SDC}-1=47$. The three curves correspond to three different sub-channels referenced SC#i.

The allocation method is more complex than matrix interleaving preceding the MT operation because of the equation $L_{DL\_FUSC}(k,s_c)$ that takes account of a base permutation DL_perm_base and of the indices k and $s_c$ used in the equation to form the sub-channels.

Furthermore, the method provides better data dispersion between adjacent channels, as shown in FIGS. 6 and 11.

The mapping module may also insert pilot symbols scattered in each sub-channel to enable OFDM equalization to be performed on reception on the basis of the received pilots. The insertion of scattered pilot symbols may be accompanied by the insertion of an OFDM preamble.

The mapped symbols are then modulated by an OFDM modulator by considering each set of $N_{SC}$ sub-channels associated with an OFDM symbol.

The mapping method is described in detail below for the PUSC mode of the Wi-Max standard (IEEE 802.16e), and as shown in FIG. 7.

The data symbols Sd are segmented into physical clusters of constant size containing twelve data symbols and two pilots per physical cluster Clust_Phy: a physical cluster has 14 sub-carriers of which 12 are data sub-carriers and two are pilot sub-carriers. Overall there are 60 physical clusters and the size of the FFT is 1024.

The position of the pilots depends on the index of the OFDMA symbol in the OFDMA slot (even or odd). These physical clusters are redistributed as logical clusters Clust_Log in application of a permutation relationship that varies form 0 to $N_{cp}-1$ with $N_{cp}$ corresponding to the number of clusters $N_{cp}=N_{used}/14=N_{SD}/12$ and including $N_{cp}$ elements (RS sequence). The number of clusters is such that the total number of data symbols Sd is equal to the number of data symbols per symbol OFDM($N_{SD}$). Thereafter, these logic clusters are segmented into six groups, G#0, . . . , G#5 capable of taking on two possible sizes (6, 4) depending on whether the group index is even or odd g={0, . . . 5}. The logic clusters of each group are allocated to sub-channels by using two allocation sequences depending on the sizes of the groups and on their indices (even or odd). Each sub-channel SC contains two logic clusters of the same group. Generating logic clusters is similar to interleaving physical clusters. Generating groups is similar to pre-segmentation that is capable of taking two possible values of segmentation size. The scattering of logic clusters in the sub-channels is equivalent to two independent interleaving relationships applied depending on the index of the logic cluster, followed by segmentation such that each sub-channel contains two logic clusters of the same group. The interleaving relationships apply within a group. The number of clusters and the number of sub-channels taken into consideration vary with the OFDM transmission mode, whereas the size of the clusters and the size of the sub-channels are independent of the OFDM transmission mode, as shown by Table 2 in Appendix A. The number of sub-channels varies with the number of data carriers per OFDMA symbol, which itself depends on the size of the transmission band and on the size of the FFT (2048, 1024, 512) of the OFDM modulator. The size (24 Sd/SC) of a sub-channel is constant and is not a parameter that can be set. In order to determine this sub-channel size, consideration is given to constraints associated with the error correcting coding algorithm for satisfying various types of error correcting coding (turbocodes, convolutional code, code efficiency). A coding block $K_b^{(u)}$ corresponds to one or more sub-channels.

A second embodiment of a prior art system is described and shown in FIG. 8. The transmission system of this system comprises a symbol interleaver ETS of matrix type ($N_L \times N_C$)=($N_{SDC} \times N_{SC}$) that serves to interleave the symbols upstream from the mapping module MT.

Matrix interleaving consists in writing the data in a matrix of size ($N_L,N_c$) row by row and in reading the data column by column.

The joint dimensioning of the interleaver and of the mapping module, and also the choice of a matrix type interleaver, make it possible to allocate the symbols of $N_{SDC}=N_L$ different groups referenced G#n amongst $N_{SC}=N_c$ sub-channels referenced SC#m. Row No. i of the matrix corresponds to a group G#i of size $N_{SC}$, whereas column j of the matrix of size $N_{SDC}$ is constituted by one data symbol from each group in position j. The allocation of symbols in the sub-channels of size $N_{SDC}$ is thus the result of joint selection of a matrix type interleaver, of dimensioning the number of rows to be equal to the size of a sub-channel, of dimensioning the number of columns to be equal to the number of sub-channels of the mapping module, and of segmenting the symbols output from the interleaver among the sub-channels of size $N_{SDC}$ by the mapping module. The scattering is performed by joint implementation of the interleaver ETS and the mapping module MT. The module MT segments the data symbols output from the matrix interleaver using a segment size ($N_{SDC}$) that corresponds to the number of elements per column of the matrix so as to form $N_{SC}$ individual sub-channels SC#j, each constituted by $N_{SDC}$ data symbols from $N_{SDC}$ different groups. The elements of column j, i.e. Cj, correspond to the data symbols in the $j^{th}$ position of each group G# and they describe the elements of the sub-channel j. These sub-channels SC#j are then allocated sequentially in frequency to form a Dr block identical to an individual OFDM frame Tre formed by a single OFDM symbol and $N_{SC}$ sub-channels SC#0, . . . , SC#$N_{SC}-1$, as shown in FIG. 9. The mapping module may also insert pilot symbols into each sub-channel in order to perform OFDM equalization on reception on the basis of the received pilots. The insertion of scattered pilot symbols may be associated with inserting an OFDM preamble. This type of mapping may be used for multiple carrier modulation, typically OFDM, including an access technique, e.g. OFDMA. The symbols associated with a user #i are in a group G#i made up of #$N_{SC}$ data symbols corresponding to the row #i of the matrix. $N_{SDC}$ groups of symbols are taken into consideration in succession and are subjected to matrix interleaving followed by symbol mapping. The data symbols mapped at the input of the OFDM modulator are segmented into $N_{SC}$ sub-channels made up of $N_{SDC}$ data symbols associated with $N_{SC}$ users (independent data groups), and these sub-channels are successively scattered in frequency.

Thus, in the techniques known in the prior art, the data symbols, possibly interleaved data symbols, are segmented into N'm sub-channels of size $N_{SDC}$ and they are scattered in the time-frequency plane by the mapping module MT. The scattering in the time-frequency plane may take place either within a frequency block of sub-channels and then per block along the time axis, as shown in FIGS. 9 and 10*a*, or else within a time-frequency block of sub-channels and then per sub-channel block along the time and frequency axes, as shown in FIGS. 4 and 10*b*.

The size $N_{SDC}$ of the sub-channels that corresponds to the elementary frequency transmission unit for OFDM methods depends on the frame size and on the minimum size of the coding blocks. When the OFDM symbols are associated with a plurality of users $u_1, u_2, \ldots, U_n$, or for example when the symbols are associated with the same user but correspond to different services (VoIP, video, etc.), then the mapping is such that a sub-channel contains either symbols from the same user or symbols that all correspond to the same service, or else symbols associated with different users/services.

In prior art systems, the size $N_{SDC}$ of the sub-channels is constant, it is not a parameter that can be set.

Known symbol mapping techniques have the drawback of reducing or even eliminating the diversity effect associated with the minimum dispersion between symbols as introduced by the symbol interleaver. It can happen that the minimum dispersion between interleaved symbols in a block K decreases as a result of the interleaved symbols being mapped into sub-channels that are scattered in time and in frequency. This comes from the fact that the scattering of the sub-channels in the time-frequency plane may cause symbols that were previously spaced apart by not less than some minimum distance s after interleaving to be moved closer together as a result of how they are positioned by the mapping module within sub-channels that are adjacent in time or in frequency. This reduction of dispersion after the mapping operation is shown in FIG. 11, which corresponds to the same OFDM transmission mode as that of the FUSC mode shown in FIG. 6.

FIG. 11 shows the scattering of symbols amongst the sub-channels after mapping of the symbols interleaved by a matrix interleaver M($N_{SDC}$,$N_{SC}$) in which the number of rows corresponds to the size of a sub-channel $N_{SDC}$ and the number of columns corresponds to the number of sub-channels $N_{SC}$.

FIG. 11*b* gives an index $i_{sd}$ to symbols after mapping amongst the sub-channels SC#0 an SC#9, with $N_{SDC}$=48 and $N_{SC}$=32 as a function of the index $i_{p/SC}$ of the carriers for a sub-channel. For each sub-channel, the carrier index takes its values from 0 to $N_{SDC}$−1=47. FIG. 11*a* is an enlargement of FIG. 11*b* for the first index values: the abscissa axis is limited to index values zero to four so as to visualize the dispersion between symbols situated at the same positions in sub-channels SC#0 and SC#9 and observe that this value is ten. Between adjacent sub-channels SC#0 and SC#1, this value is only one. These dispersion values may be calculated analytically, knowing that the matrix interleaving relationship is given by the following equation:

$$L_M(k) = E\left\{\frac{k}{N_{SDC}}\right\} + N_{SC} \cdot [k]_{N_{SDC}}$$

$$k = \{0, \ldots, N_{SDC} - 1\}$$

The dispersion between adjacent sub-channels is given by the following equation:

$$\Delta L_M(s) = \underset{k < N_{SDC}}{\text{Min}} |L_M(k+s) - L_M(k)|$$

$$s = N_{SDC} \cdot m$$

The first term of $L_M(k)$ thus provides the dispersion between adjacent sub-channels. Two symbols having the same carrier position in two different sub-channels present a dispersion that is equal to the index variation between those sub-channels.

Thus, matrix interleaving makes it possible to obtain a dispersion of thirty-two within a sub-channel. However if the sub-channels are mapped firstly in time, then the dispersion between two channels that are adjacent in time is no more than one. This configuration of matrix interleaving and mapping thus reduces or even eliminates the dispersion effect along the time axis that was introduced by the interleaver.

SUMMARY OF THE INVENTION

The invention proposes a method of mapping interleaved data symbols at the input of a multi-carrier modulator, which method serves to attenuate the negative impact of mapping on the diversity previously imparted by interleaving the data symbols.

Thus, the invention provides a method of mapping data symbols at the input of a multi-carrier modulator, which data symbols are interleaved in blocks of K symbols, into sub-channels of size equal to $N_{SDC}$ consecutive carriers scattered to one or more multi-carrier symbols, $N_{SDC}$ being a sub-multiple of K, such that the size $N_{SDC}$ of the sub-channels is determined as a function of a symbol interleaving pattern diversity between sub-channels.

The invention also provides a mapping module for implementing a method of the invention.

Thus, a mapping module of the invention is adapted to map data symbols at the input of a multi-carrier modulator, which data symbols are interleaved in blocks of K symbols, into sub-channels of size equal to $N_{SDC}$ consecutive carriers scattered over one or more multi-carrier symbols, where $N_{SDC}$ is a sub-multiple of K. The module is also adapted to determine a sub-channel size as a function of a symbol interleaving pattern diversity between sub-channels.

In multi-carrier transmission, a multi-carrier symbol is transmitted in a symbol time (time slot) and it occupies a bandwidth B. A sub-channel generally corresponds to grouping a plurality of carriers together within a multi-carrier symbol time. The size of a sub-channel corresponds to the number of carriers grouped together in the sub-channel.

During the mapping step, the symbols from the interleaving step are segmented into different sub-channels, which are themselves scattered in time and in frequency. Typically, a sub-channel contains symbols from a given user. Thus, with a plurality of users, the symbols from different users are segmented into different sub-channels. With different services for a given user, the respective symbols of the different services are typically segmented into different sub-channels. By way of example, such segmentation makes it possible to distinguish the quality of service (QoS) between services, by giving more sub-channels to one given service than to another (or by reserving a certain frequency bandwidth to a given service).

The diversity of symbol interleaving patterns between sub-channels is evaluated by measuring differences between the interleaving patterns of symbols contained in the sub-channels, i.e. measuring the differences between the distributions of symbol indices in the sub-channels. This measurement may be limited to sub-channels that are adjacent, or it may be enlarged to sub-channels that are not adjacent.

The method and the device in accordance with the invention solve the problem posed. When dimensioning the size of the sub-channels, by taking account of the mapping of the interleaved symbols over sub-channels that are allocated in time, in frequency, or both in time and in frequency, i.e. respectively between a plurality of multi-carrier symbols for a given frequency band, within a given multi-carrier symbol, or between a plurality of multi-carrier symbols, it is possible to keep away from potential values that give rise to the symbol interleaving pattern being repeated between sub-channels that are adjacent or between sub-channels that are not adjacent, being spaced apart to a greater or lesser extent depending on the implementation. A method of the invention provides maximum diversity at the input to the multi-carrier modulator. In particularly advantageous manner, a method of the invention thus makes it possible to scatter sub-channels in the time-frequency plane in any manner, while ensuring maximum time-frequency diversity of patterns, on the sole condition that the sub-channels are of a size as determined by the invention for the interleaving relationship $L(k)$ under consideration. Furthermore, by providing an optimum combination of interleaving and mapping via a diversity of interleaving patterns and a maximum dispersion between symbols within a sub-channel, a method of the invention makes it possible to achieve maximum time-frequency diversity, thereby maximizing the capacity of the system, and this can be done regardless of the number of users. Achieving maximum time-frequency diversity optimally combats the correlation effects that are introduced by the transmission channel. Consequently, a method of the invention makes it possible to improve reception performance as evaluated by a binary error rate resulting from de-mapping and de-interleaving processes, constituting the inverses respectively of the mapping and symbol interleaving processes, thereby making it possible to attenuate the disturbances that are introduced by the channel by spreading them out in the time-frequency plane, which gives rise to decorrelation of the transmitted symbols.

The size of the sub-channels may typically be determined by comparing interleaving pattern differences between adjacent sub-channels for different sub-channel sizes and by selecting a size for which the differences are the most significant, i.e. for which the diversity is the greatest.

In a particular implementation, the method of the invention for mapping interleaved data symbols at the input of a multi-carrier modulator is such that the symbol interleaving pattern diversity between sub-channels is evaluated for groups of sub-channels that are spaced apart by no more than one sub-channel.

This implementation serves to limit the operations of evaluating diversity by limiting pattern comparisons for a given sub-channel. The implementation that, when comparing patterns for a given sub-channel, takes account of channels that are adjacent and of sub-channels that are remote from a given sub-channel may be particularly adapted to pseudo-periodic interleaving relationships, e.g. relationships for which the mathematical expression includes a modulo operator. In particular, evaluating diversity over three sub-channels that are spaced apart by one sub-channel at the most serves to eliminate size values that correspond to the pseudo-period.

In a particular implementation, a method of the invention for mapping interleaved data symbols at the input of a multi-carrier modulator is such that the groups are made up of pairs of adjacent sub-channels.

This implementation is particularly adapted to interleaving relationships that are not pseudo-periodic, e.g. relationships for which the mathematical expression does not include the modulo operator.

In a particular implementation, a method of the invention for mapping interleaved data symbols at the input to a multi-carrier modulator comprises:

a first step of calculating a dispersion function $\Delta L(s)$ representing the minimum distance between the input symbols $(X(L(k)))$ as a function of the difference s between interleaved symbols $(Y(k+s),Y(k))$ for a given interleaving relationship $L(k)$;

second step of pre-selecting different values s', sub-multiples of K, for which the dispersion values satisfy an amplitude criterion; and a third step of evaluating a geometrical diversity between the sub-channels for the different values of pre-selected differences s', the size $N_{SDC}$ of the sub-channels being determined to be equal to one of the pre-selected difference values s' for which the geometrical diversity is at a maximum.

In this implementation, the method evaluates diversity in the frequency plane during a first step in application of a criterion for dispersion between data symbols interleaved in application of a given relationship, and then evaluates interleaving pattern diversity in application of a geometrical diversity criterion during a third step. Performing these steps one after another serves to limit the amount of calculation performed during the third step to calculating the potential size values for only the sub-channels that correspond to the difference values s' as selected during the second step. The interleaving relationships may initially be predetermined or it may correspond to making a selection from a list of interleaving relationships. Under such circumstances, the steps may be repeated for each of the relationships. The method may select one of the relationships, either at the end of the first step by selecting the relationship that gives the best dispersion values, or at the end of the third step by selecting the relationship that gives the best geometrical diversity values. In this implementation, the method provides an optimum combination of interleaving and mapping via a maximum dispersion between symbols within a sub-channel and a diversity of interleaving patterns. Such an implementation makes it possible to achieve the maximum time-frequency diversity.

In a particular implementation, a method of the invention for mapping interleaved data symbols at the input to a multi-carrier modulator is such that K is equal to the size of a multi-carrier symbol.

The choice of an interleaving depth K equal to the size of a multi-carrier symbol serves to minimize latency, which slows down processing on reception.

In a particular implementation, a method of the invention for mapping interleaved data symbols at the input of a multi-carrier modulator is such that K is a multiple of the size of a multi-carrier symbol.

Selecting an interleaving depth K that is a multiple of the size of a multi-carrier symbol serves to increase the effect of the diversity introduced by the interleaving.

The various above implementations may be combined with one or more of these implementations in order to define other implementations.

The invention also provides a method of transmission that is adapted in that it includes a mapping method of the invention.

The invention also provides a telecommunications transmitter adapted to implement a method of the invention.

Thus, a telecommunications transmitter of the invention includes, between a modulator generating data symbols and a multi-carrier modulator generating multi-carrier symbols, an interleaver for interleaving a block of K data symbols, and a mapping module of the invention.

The invention also provides a telecommunications system adapted to implement a method of the invention.

Thus, a telecommunications system of the invention comprises a transmitter having the above adaptation, and a receiver.

DETAILED DESCRIPTION

Other characteristics and advantages of the invention appear from the following description with reference to the accompanying figures given as non-limiting examples.

Figure 1:
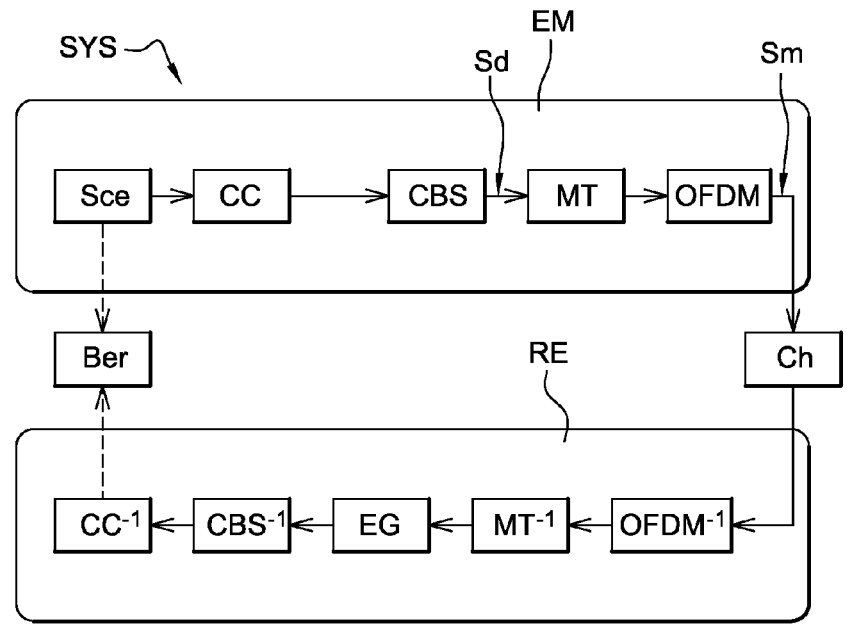
FIG. 1 is a block diagram showing a conventional transceiver system.

FIG. 1 shows a conventional transceiver system described in baseband for a prior art system SYS.

Figure 2:
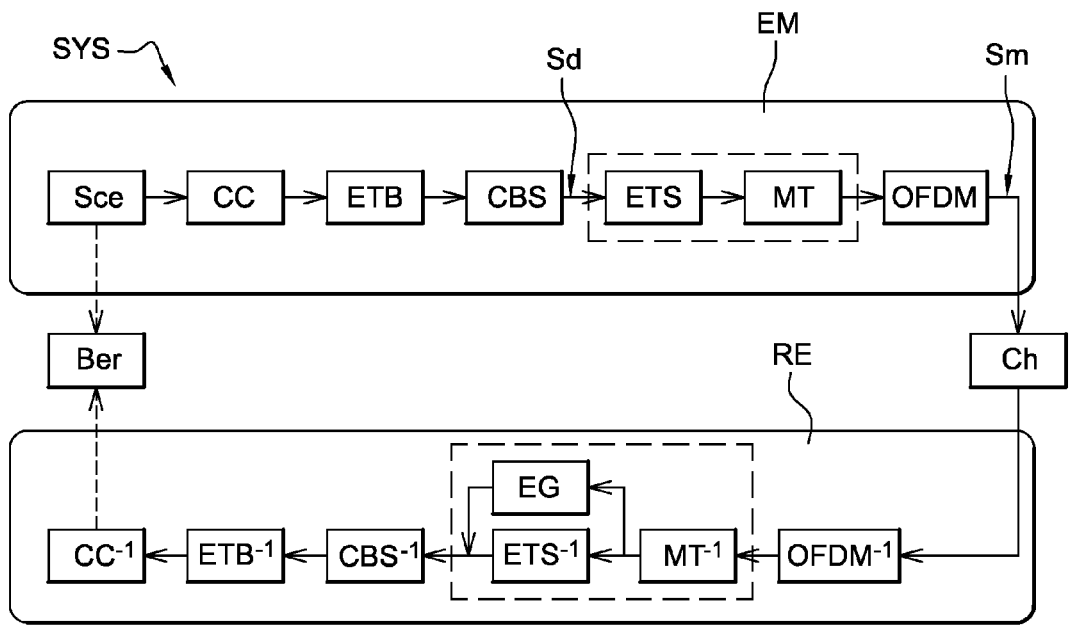
FIG. 2 is a block diagram showing a conventional transceiver system showing interleaving ETB and ETS.

FIG. 2 shows a conventional transceiver system including interleaving ETB performed on the binary data and interleaving ETS performed on the data symbols Sd, described in baseband for a prior art system SYS.

Figure 3:
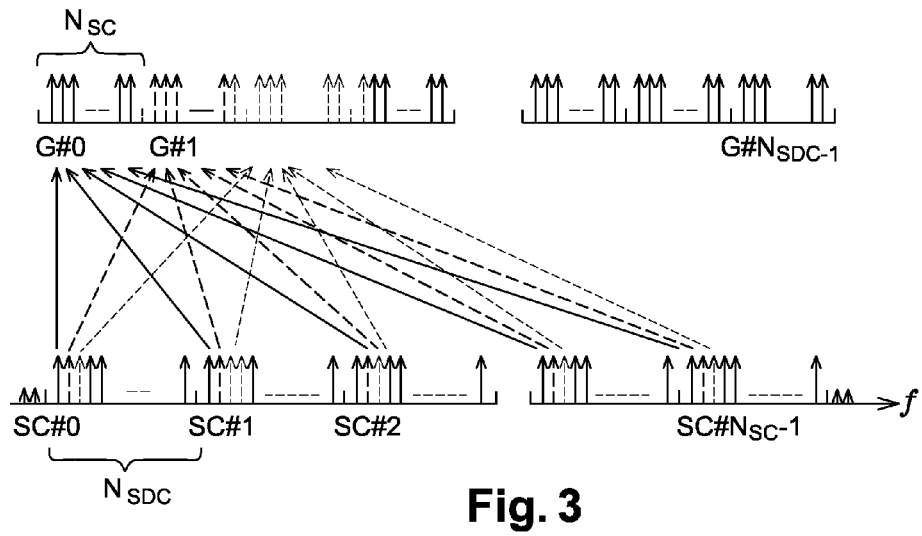
FIG. 3 is a pictorial diagram of a prior art mapping technique.

FIG. 3 is a diagram of a prior art mapping technique consisting in scattering a different symbol from each group of users to each sub-channel and in distributing the sub-channels in time and in frequency in such a manner as to mix different users within a given OFDM symbol.

FIGS. 4, 5, 6, and 7 relate to a prior art system complying with the standard IEEE 802.16e.

Figure 4:
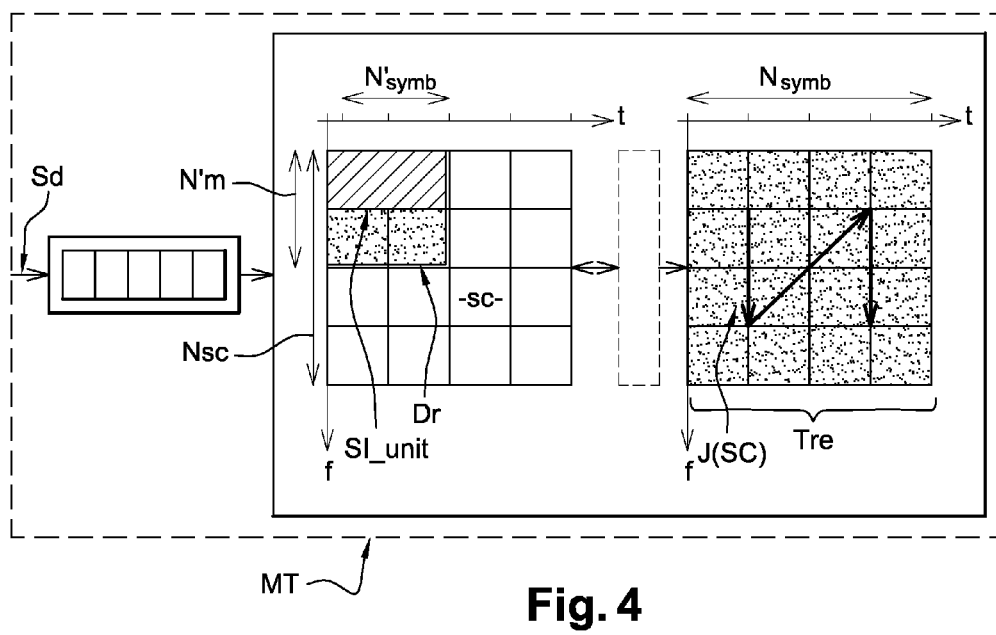
FIG. 4 is a pictorial illustration of a prior art 802.16e mapping method.

FIG. 4 is a diagram of the mapping method.

Figure 5:
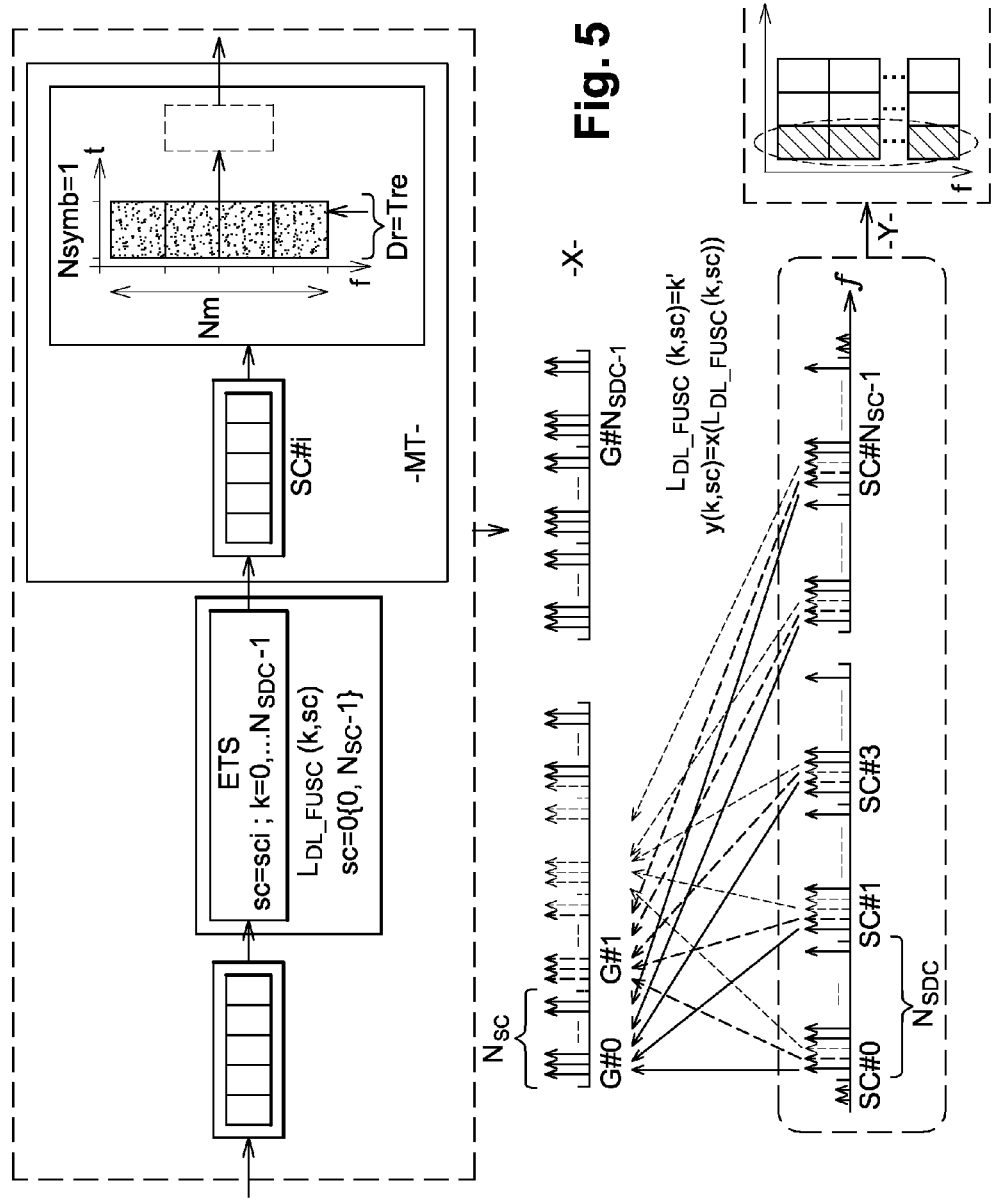
FIG. 5 is a pictorial block diagram illustrating the mapping method for FUSC mode for the down path.

FIG. 5 is a detail diagram of the mapping method for FUSC mode for the down path.

Figure 6:
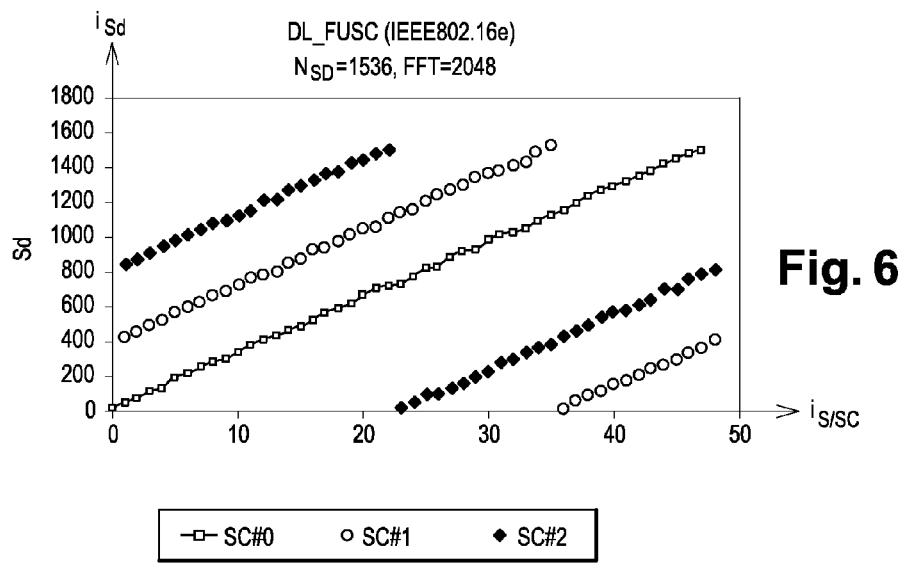
FIG. 6 is a graph charting data symbols in the sub-channels.

FIG. 6 shows the scattering of data symbols in the sub-channels in application of the relationship $L_{DL\ FUSC(k,sc)}$ for the FUSC mode for an FFT of size equal to 2048.

Figure 7:
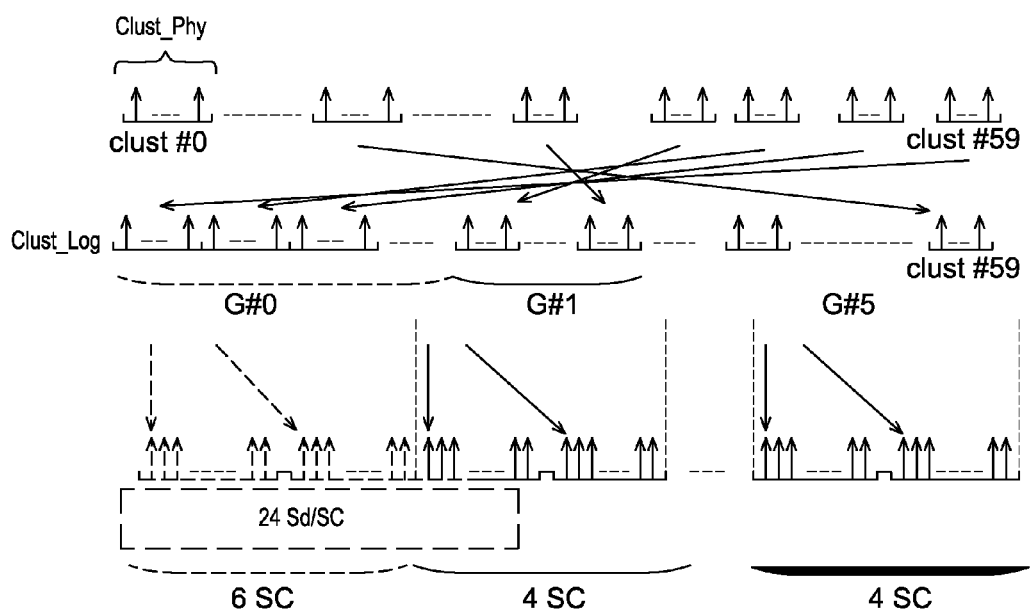
FIG. 7 is a pictorial diagram of the mapping method for PUSC mode.

FIG. 7 is a detail diagram of the mapping method for PUSC mode in the Wi-Max standard (IEEE 802.16e).

Figure 8:
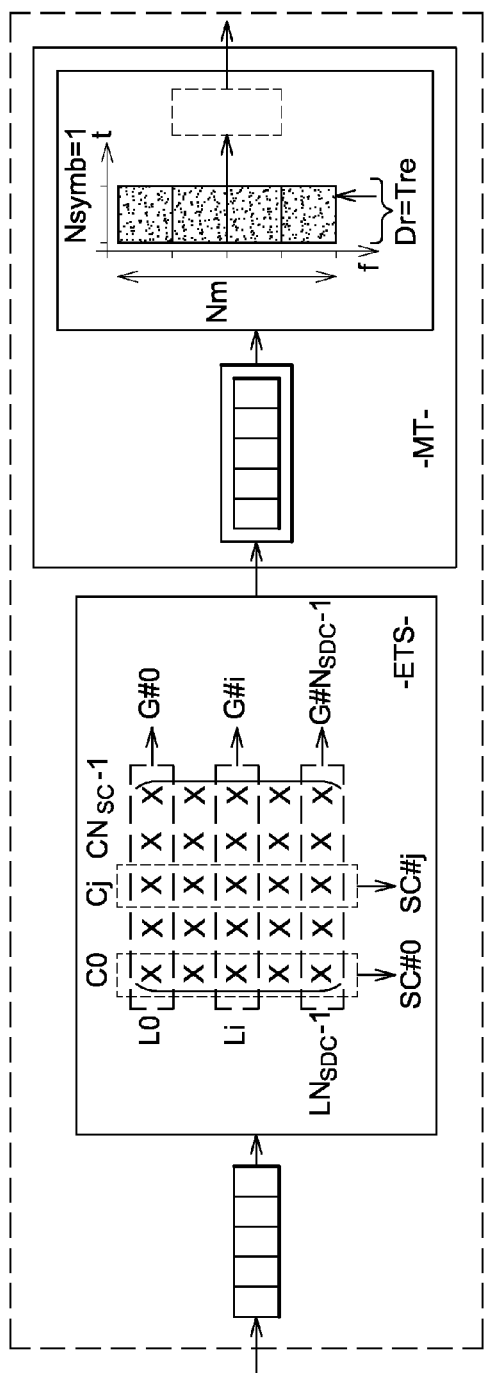
FIG. 8 is a pictorial block diagram of another prior art mapping method.
Figure 8:
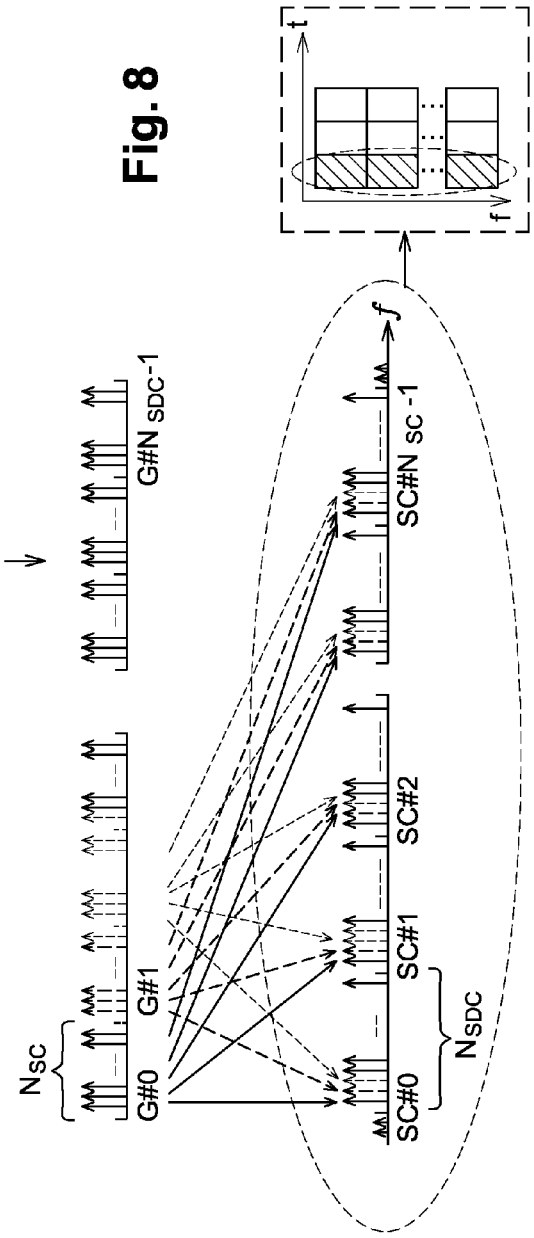

FIG. 8 shows another implementation of the prior art mapping method relating to a system that has a matrix type symbol interleaver ETS.

Figure 9:
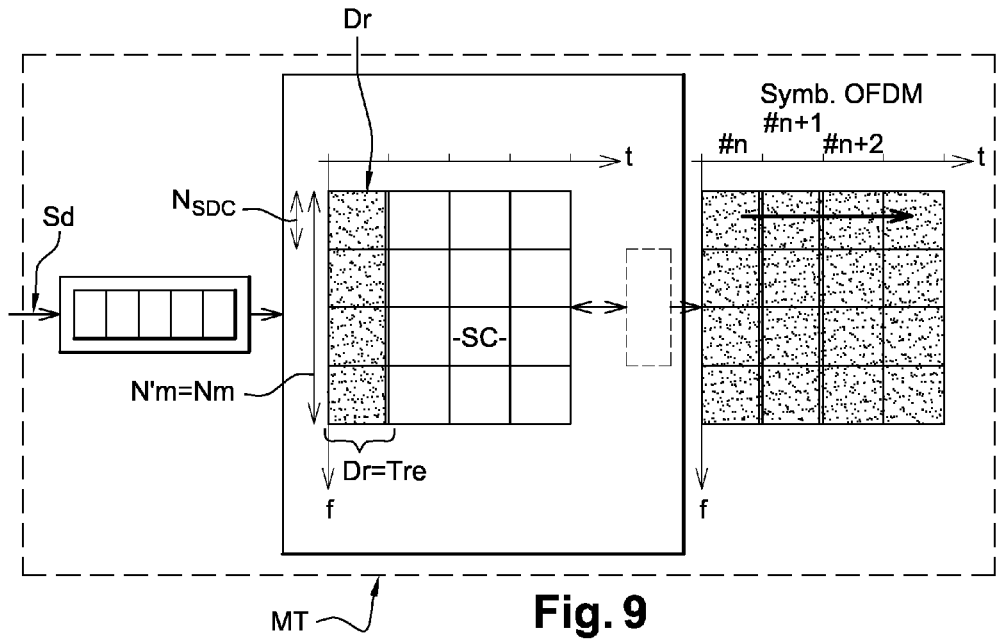
FIG. 9 is a block diagram of the FIG. 8 mapping method showing the allocation of symbols in the time-frequency plane.

FIG. 9 is a diagram of the FIG. 8 mapping method showing the allocation of symbols in the time-frequency plane.

Figure 10:
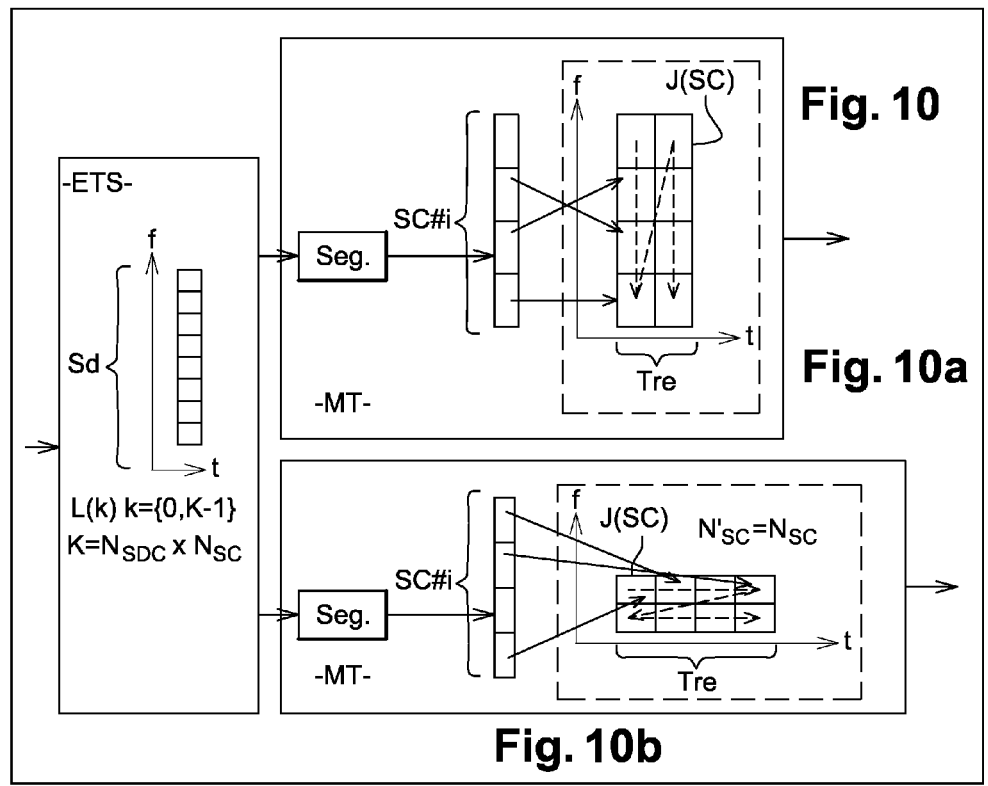
FIG. 10 is a block diagram of an interleaver followed by a mapping module.

FIG. 10 is a diagram of an interleaver ETS followed by a mapping module MT with sub-channels being allocated in frequency and then in time using the mapping module of FIG. 10a or with distribution of the sub-channels in time and then in frequency using the mapping module of FIG. 10b.

Figure 11:
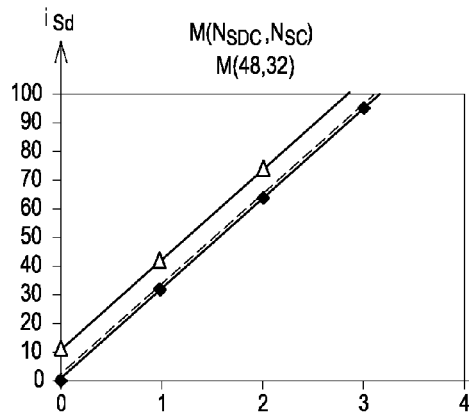
FIG. 11 are graphs showing allocation in the time-frequency plane of symbols among the sub-channels.
Figure 11:
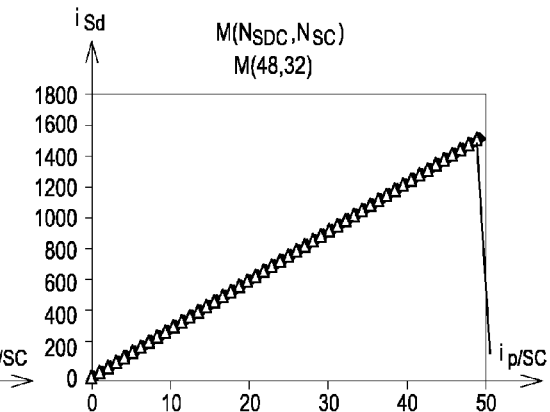

FIG. 11 shows the allocation in the time-frequency plane of symbols amongst the sub-channels after mapping of the symbols interleaved by a matrix interleaver in which the number of rows corresponds to the size of a sub-channel $N_{SDC}$ and the number of columns corresponds to the number of sub-channels $N_{SC}$ in a prior art method corresponding to the same OFDM transmission mode as that of the FUSC mode shown in FIG. 6, FIG. 11 showing how dispersion is reduced after the mapping process.

Figure 12:
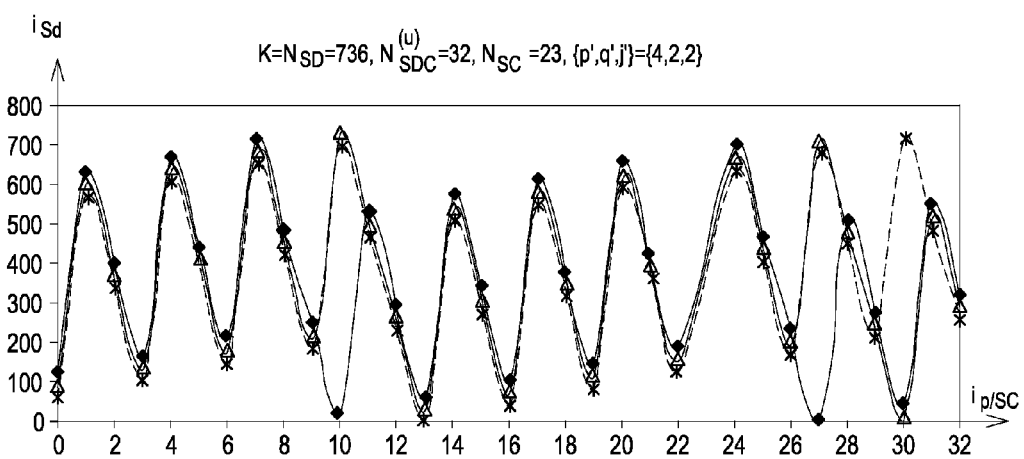
FIG. 12 is a graph showing a scattering of data symbols interleaved.

FIG. 12 shows the scattering of data symbols interleaved using a block interleaving relationship of size $K=N_{SD}=736$ of the prior art turbo type over three adjacent sub-channels that are in succession in time, this figure showing the negative effect of the mapping on the symbols.

Figure 13:
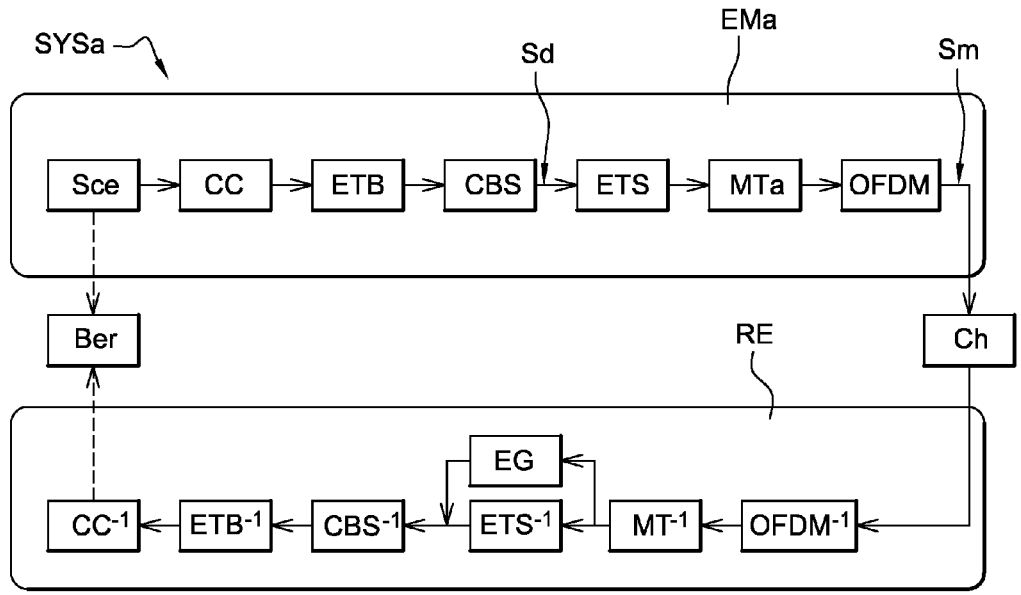
FIG. 13 is a block diagram of another exemplary transmission system.

FIG. 13 is a block diagram showing an example of a transmission system SYSa described in baseband and adapted in accordance with the invention to implement a mapping method of the invention.

Figure 14:
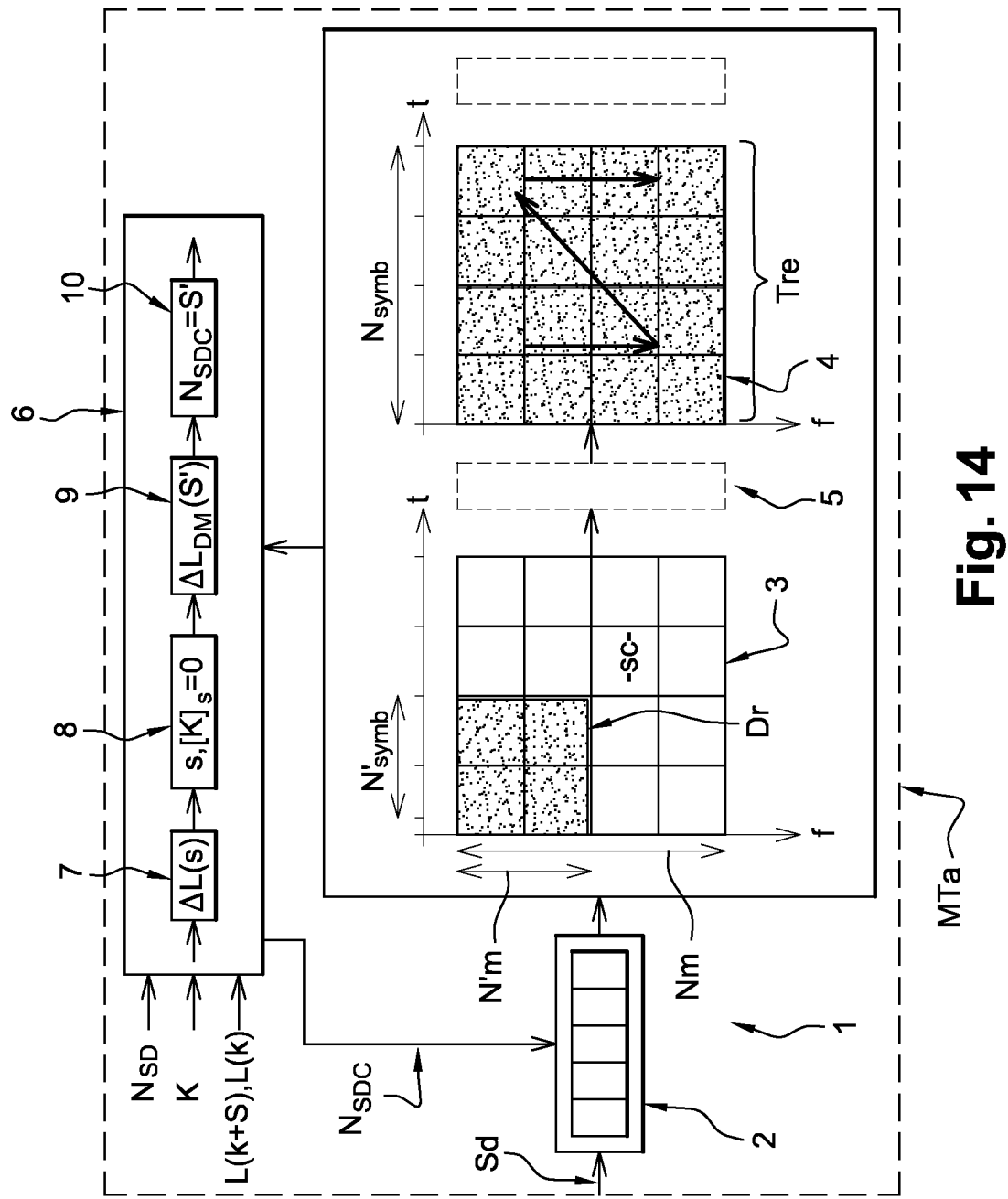
FIG. 14 is a pictorial block diagram illustrating mapping data symbols inpt to an OFDM modulator.

FIG. 14 is a diagram of a mapping module MTa adapted in accordance with the invention to map the data symbols input to an OFDM modulator according to the mapping method of the invention.

Figure 15:
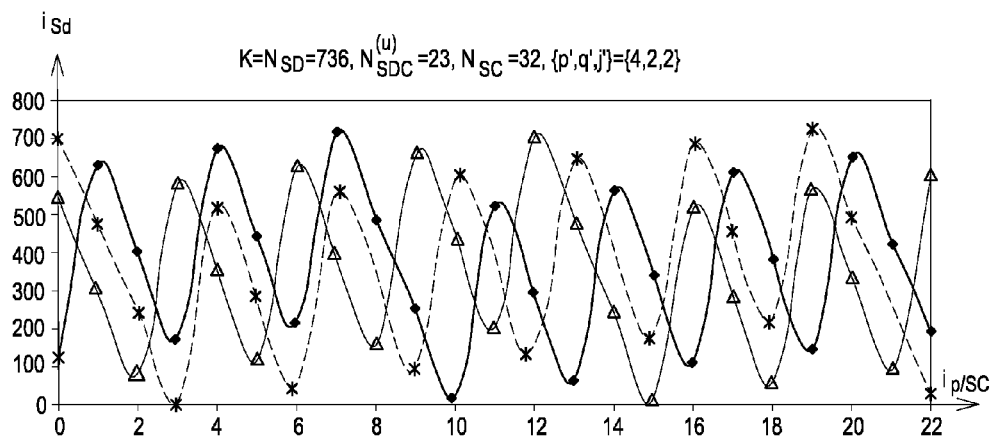
FIG. 15 is a graph showing a scattering of symbols over three adjacent sub-channels.

FIG. 15 shows the scattering of symbols over three adjacent sub-channels that succeed one another in time when using a mapping method of the invention, this figure showing the effect of the mapping on the interleaved data symbols.

Figure 16:
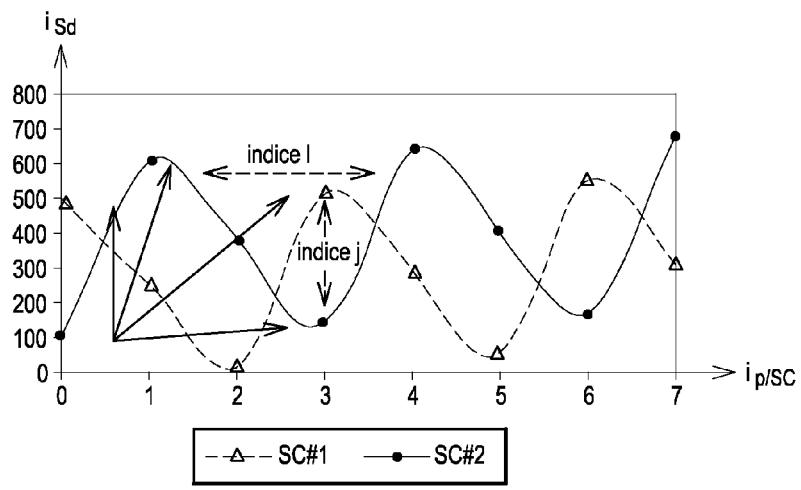
FIG. 16 is a graph showing the quantification of the diversity of interleaving patterns between sub-channels.

FIG. 16 shows the quantification of the diversity of interleaving patterns between sub-channels performed by means of a geometrical diversity criterion put in the form of a double summing equation concerning the indices j and l with the effect thereof being represented by three arrows.

Figure 17:
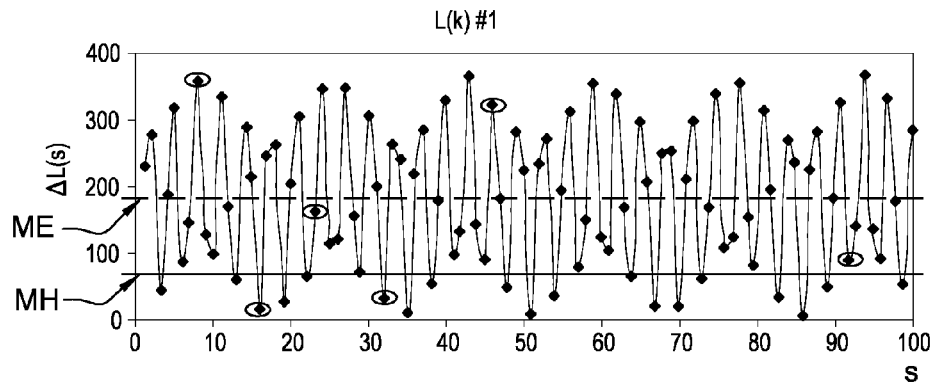
FIG. 17 is a graph showing the dispersion for different values obtained useing a turbo interleaving relationship.

FIG. 17 is a curve showing the dispersion ΔL(s) for different values of s obtained using the turbo interleaving relationship $L_{TL}(k)=I_{p,q}^{(j)}(k)$ with the values of the median ME and of the harmonic mean MH being positioned thereon.

Figure 18:
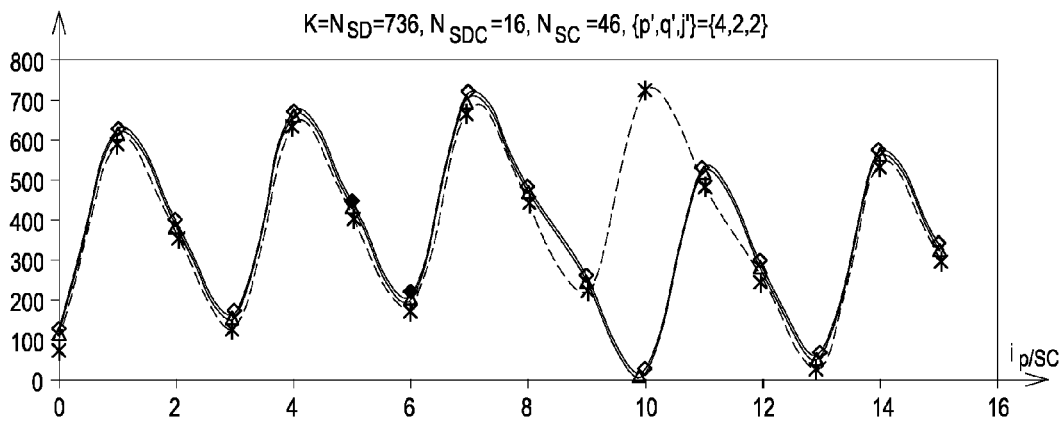
FIG. 18 is a graph showing corresponding selection relative to a particular curve.

FIGS. 18 and 12 correspond to selection relative to the curve 17 respectively for s'=16, giving a number of sub-channels $N_{SC}$=46, and for s'=32, giving a number of sub-channels $N_{SC}$=23. s'=16 and s'=32 lead to a dispersion ΔL(s) that is lower than the harmonic mean MH, and it can clearly be seen that the symbol interleaving patterns present no diversity between sub-channels.

Figure 19:
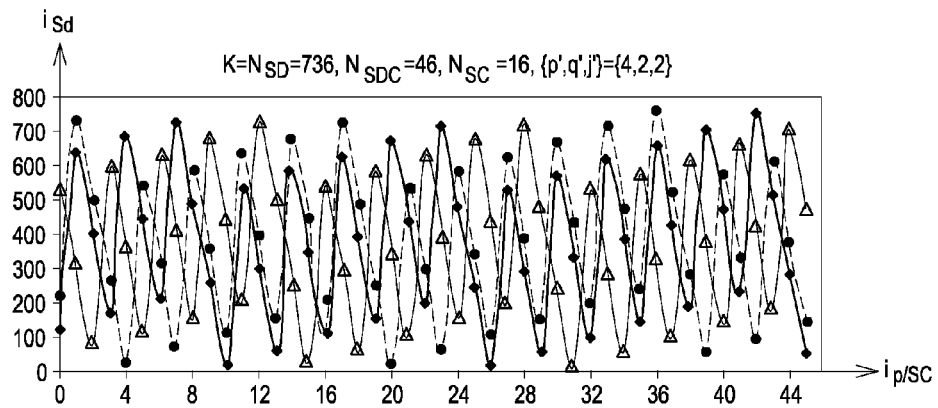
FIG. 19 is a graph showing corresponding selection to another curve.

FIGS. 19 and 15 correspond to selection relative to the curve 17 respectively for s'=46, giving a number of sub-channels $N_{SC}$=16, and for s'=23, giving a number of sub-channels $N_{SC}$=32. s'=23 and s'=46 lead to a dispersion ΔL(s) that is greater than the harmonic mean MH, and it can clearly be seen that the symbol interleaving patterns present diversity between sub-channels.

FIG. 13 shows an OFDM type transmission system SYS known to the person skilled in the art. The information from a source Sce is coded using a coder CC. The data is then put into the form of data symbols (QAM, QPSK, . . . cells) by a modulator CBS. The data symbols are interleaved by an interleaver ETS. The interleaved data symbols are segmented into sub-channels of individual size $N_{SDC}$ and put into parallel to be scattered in time and in frequency to the input of an OFDM modulator by the mapping module. The OFDM modulator calculates the OFDM symbols from the mapped data symbols input thereto.

A known method of transmitting a multi-carrier signal, typically implemented by the transmitter EM of the system SYS comprises:

a step of modulation by the modulator CBS generating (data) symbols;

a step of interleaving a block of K (data) symbols by the interleaver ETS using a relationship L(k);

a step of mapping performed by the module for mapping the interleaved (data) symbols into sub-channels of size equal to $N_{SDC}$ consecutive carriers that are scattered over one or more OFDM symbols, $N_{SDC}$ being a sub-multiple of K, in application of a relationship J(k); and a step of OFDM modulation by an OFDM modulator generating OFDM symbols.

K is a multiple of the number of data symbols per OFDM/OFDMA symbol.

When the mapping step takes account of users, or more generally distinguishes between groups of symbols that may be of different origins, e.g. coming from different services, the transmission method is said to be of the OFDMA type.

FIG. 12 shows the negative effect of the mapping on the interleaved data symbols when using a prior art OFDMA method. An OFDMA method scatters to carriers of a given OFDM symbol, data symbols that are associated with different users (or different origins, e.g. different services). The data symbols from one or more users are allocated amongst sub-channels of individual size $N_{SDC}$. These sub-channels are then scattered in frequency so as to mix different users within a given OFDM symbol comprising $N_{SD}$ data symbols, and in time amongst OFDM symbols. FIG. 12 gives the index $i_{Sd}$ of the symbols after mapping amongst the sub-channels SC#0, SC#1, and SC#2 with $N_{SDC}^{(u)}$=32 and $N_{SC}$=23, as a function of the index $i_{p/SC}$ of the symbols for a sub-channel. FIG. 12 shows the scattering of the symbols amongst three adjacent sub-channels SC#0, SC#1, and SC#2 that are successive in time. These scatterings are superposed in FIG. 12 since the three sub-channels occupy the same sub-carriers. FIG. 12 relates to interleaving with a block of size K=$N_{SD}$=736 in application of a turbo type interleaving relationships as described in PCT patent application No. 2006/072694, with the parameters (p',q',j')={4,2,2} followed by mapping amongst sub-channels of size $N_{SDC}^{(u)}$=32 for each user u. This succession of interleaving and of mapping gives rise, for each user u, to scattering pattern similarity amongst the adjacent sub-channels SC#0 and SC#1 and also amongst the adjacent sub-channels SC#1 and SC#2. If these sub-channels are scattered along the time scale, as shown in FIG. 10b, and if the propagation channel varies little, then the performance of the decoder on reception is limited by the fact of an interleaving pattern being repeated between these adjacent sub-channels.

Unlike known techniques, the invention enables time and/or frequency diversity to be introduced into the propagation channel that is beneficial for the decoder module on reception, and it does so by ensuring that there are differences between the interleaving patterns amongst adjacent sub-channels. In frequency, the probability is lower of not benefiting from the natural frequency selectivity of the propagation channel.

FIG. 13 is a block diagram of an example of a transmission system SYSa adapted in accordance with the invention to implement a mapping method of the invention.

The transmission system SYSa is adapted in accordance with the invention in that it comprises a transmitter EMa adapted in accordance with the invention to determine a size of the sub-channels as a function of a diversity of symbol interleaving patterns between sub-channels. The transmitter is adapted in that the mapping module MTa is adapted to map the interleaved symbols over sub-channels of size equal to $N_{SDC}$ consecutive carriers scattered over one or more multi-carrier symbols, where $N_{SDC}$ is a sub-multiple of K and is determined by the mapping module MTa as a function of a diversity of symbol interleaving patterns between sub-channels.

FIG. 14 is a diagram of a mapping module MTa adapted in accordance with the invention for mapping data symbols input to an OFDM modulator in application of a mapping method 1 of the invention. The mapping module MTa segments, at 2, the data symbols Sd interleaved in N'm sub-channels of size $N_{SDC}$ and scatters at 3, 4, the sub-channels in the time-frequency plane. The mapping module may also insert pilots, at 5, into each sub-channel or into some of the sub-channels at determined positions in order to enable OFDM equalization to be performed on reception on the basis of the received pilots. The insertion of pilots may be associated with the insertion, at 5, of a preamble. The mapping module MTa determines, at 6, the size $N_{SDC}$ of the sub-channels as a function of the diversity of the symbol interleaving patterns between sub-channels.

FIG. 15 shows the effect of the mapping on the interleaved data symbols when using a mapping method of the invention. FIG. 15 shows the scattering of symbols in three adjacent sub-channels that are successive in time. These scatterings are superposed in FIG. 15 since the three sub-channels occupy the same sub-carriers. The effect of mapping in accordance with the invention gives rise to a difference of interleaving pattern between adjacent sub-channels. In order to ensure that there is a difference of pattern between adjacent sub-channels, a mapping method of the invention determines a size $N_{SDC}$ for the sub-channels by taking account of a symbol interleaving diversity between sub-channels. In this example, the determined size is equal to $N_{SDC}^{(u)}$=23.

In order to determine the size $N_{SDC}$ of the sub-channels, the method 1 comprises a plurality of steps in a preferred implementation, as shown in FIG. 14. These steps take place in a calculation module implemented in a field programmable gate array (FPGA), in a microprocessor, or in any equivalent calculation means. Depending on the implementation, these steps may take place completely or in part in parallel.

In a first step 7, the method determines the values of a dispersion function $\Delta L(s) = \text{Min}_k |L(k) - L(k+s)|$. The dispersion function $\Delta L(s)$ represents the minimum distance between the input data symbols $(X(L(k+s)), X(L(k)))$ of the interleaver as a function of the distance s between the interleaved symbols $(Y(k+s), Y(k))$, where s varies over the range 1 to K. This dispersion function is determined for a given interleaving relationships $L(k)$.

An interleaving relationship $L(k)$ for a block of size K gives the order in which an input sequence formed by K data symbols having an index k varying over the range 0 to K−1 should be read at the output. Let $X(k)$ be a sequence of data symbols input to an interleaver having an interleaving relationship $L(k)$. Let $Y(k)$ be the sequence of data elements at the outlet from the interleaver. Then $Y(k) = X(L(k))$: the $k^{th}$ data element Y of the interleaved sequence having position index k−1 corresponds to the data element X of index $L(k-1)$ of the input sequence $X(0), \ldots, X(K-1)$. The interleaving relationship $L(k)$ is a bijective function that takes its values from the space $S = \{0, \ldots, K-1\}$. The dispersion is defined as being the smallest distance after interleaving between two position indices associated with two input data elements that are separated by s−1 data elements, $X(k)$ and $X(k+s)$. The dispersion function is given by the relationship $\Delta L(s) = \text{Min}_{k, k \in S} |L(k+s) - L(k)|$ for s varying over the range 1 to K. The function $|x|$ provides the absolute value of x.

In an embodiment in which K is equal to the size $N_{SD}$ of a multi-carrier symbol, the method limits calculation of the dispersion function to s varying over the range 1 to K/2. The size of a sub-channel is at most equal to half the size of a multi-carrier symbol so as to be able to perform mapping of symbols into sub-channels that are scattered in time and/or in frequency. When K is a multiple of the size of a multi-carrier symbol, then the method can limit calculation of the dispersion function to s varying over the range 1 to $N_{SD}/2$, where $N_{SD}$ is the number of data symbols per multi-carrier symbol. Finally, whether K is equal to $N_{SD}$ or to a multiple of $N_{SD}$, the method can limit calculation of the dispersion function to s varying over the range 1 to $N_{SD}/2$.

In a second step 8, the method pre-selects values of s that are sub-multiples of K for which the dispersion values satisfy an amplitude criterion.

In a first implementation, the amplitude criterion corresponds to a relative maximum in the dispersion. The pre-selected values s' equal to the abscissa axis values corresponding to these relative maximums correspond to the different sizes that can be envisaged for the sub-channels. The method determines the values of s sub-multiples of K, e.g. by using a modulo function: the set of sub-multiples of K is equal to the set of values of s for which $[K]_s = 0$. These values are written s'. For these various values of s', the method determines the value of the derivative of the dispersion function. If the value is zero, then the dispersion function presents a relative maximum for the value of s' under consideration.

In a second implementation, the amplitude criterion corresponds to a threshold: the method pre-selects values of s that are sub-multiples of K for which the dispersion exceeds a threshold S. This threshold S may correspond to the harmonic mean MH of the dispersion calculated on $N_{SD}/2$ samples (half the size of a multi-carrier symbol so as to be able to take at least two sub-channels into consideration). The harmonic mean MH is equal to the reciprocal of the arithmetic mean of the reciprocals of the observations:

$$\frac{1}{MH} = \frac{1}{N} \sum_{s=0}^{N-1} \frac{1}{|\Delta L(s)|^2}$$

with $N = N_{SD}/2$. This threshold S may be set using an analytic calculation, it may be set arbitrarily, or it may take the value of a parameter.

In a third step 9, the method evaluates a geometrical diversity for the various pre-selected difference values s'.

In one implementation, the method evaluates a geometrical diversity for a given difference value s', by calculating $\Delta L_{DM}(s')$, which is a function that quantifies the geometrical diversity of the interleaving relationships in the form of a dispersion averaged over several values of s. This function is defined by the following relationship:

$$\Delta L_{DM}(s') \underset{k}{\text{Median}} \left\{ \frac{\sum_{j=1}^{N_{sc}^0 - 1} \left( \sum_{l=0}^{s'-1} |L(k+j \cdot s') - L(k+l)| \right)}{(N_{sc}^0 - 1)} \right\}$$

where Median is the function that calculates the median value of the set of values obtained by causing k to vary from 0 to $K/s'-1$.

The index j serves to incorporate a plurality of sub-channels in the calculation of an average dispersion. If j is set at zero, then $\Delta L_{DM}(s)$ provides the mean dispersion within one sub-channel regardless of the index of the sub-channel. This parameter is given by:

$$\Delta L_{DM}^{int}(s') = \underset{k}{\text{Median}} \left\{ \frac{1}{s'} \sum_{l=0}^{s'-1} |L(k) - L(k+l)| \right\}$$

If the index l is set at zero, then $\Delta L_{DM}$ provides the mean dispersion between sub-channels by considering the same position within each sub-channel. This parameter is given by:

$$\Delta L_{DM}^{s0}(s') \underset{k}{\text{Median}} \left\{ \frac{\sum_{j=1}^{N_{sc}^0} |L(k+j \cdot s') - L(k)|}{N_{sc}^0} \right\}$$

In a particular implementation, the method takes four adjacent channels into consideration for performing this calculation, thereby limiting the maximum value of j to $N_{sc}^0 = 4$. Greater values do not enable a pattern diversity to be taken into account since the mean does not take into account the notion of the order of the sub-channels. If j and l vary simultaneously, then $\Delta L_{DM}(s)$ provides the overall dispersion between sub-channels incorporating the intrinsic mean dispersion within each sub-channel and the mean dispersion between $N_{sc}^0 = 4$ sub-channels. All possible positions between the sub-channels are taken into consideration in order to quantify a pattern diversity dispersion.

Geometrical diversity may be evaluated in equivalent manner while being quantified differently. For example, for each of the pre-selected values s', the evaluation may be limited: to making a comparison between sub-channels of the m first interleaved symbols, with m being small compared with s', e.g. four, five, ten, ..., to determining the smallest index of the first interleaved symbols of each of the sub-channels; to taking as a reference the sub-channel including the interleaved symbol having the smallest index; to subtracting the value of the smallest index from each of the indices of the interleaved symbols taking into consideration from the other sub-channels; or to determining the index differences of the interleaved symbols of the reference sub-channel relative to the indices of the interleaved symbols of the other sub-channels for a given position value k in a sub-channel.

In a fourth step 10, the method determines the size $N_{SDC}$ of the sub-channels by selecting from amongst the pre-selected difference values s', one of the values of s' for which the geometrical diversity is at a maximum.

The selected s' value leads to an interleaving pattern diversity between the sub-channels. This diversity is ensured by maximizing the dispersion for $\Delta L(s=s')$ and also a geometrical pattern diversity between a plurality of sub-channels that are adjacent or that are spaced apart, e.g. by no more than three sub-channels, as estimated using the parameter $\Delta L_{DM}(s=s')$.

This selection depends on the interleaving relationship and it leads to an optimum scattering of sub-channels with a maximum time-frequency diversity order of the sub-channels. This diversity order depends only on the interleaving relationship L(k) and on the size of the sub-channels $N_{SDC}^{(u)}=s'$.

Two implementations of the method of the invention are described below with reference to the curves of FIGS. 12, 15, 17, 18, and 19, and to the curves of FIGS. 20 and 21 obtained with an OFDM transceiver system implementing such a method.

The first example relates to a system SYSa for which the interleaver ETS implements an interleaving relationship L(k) of turbo structure as described in above-mentioned PCT patent application No. 2006/072694.

The interleaving relationship L(k) provides the position of the output symbol at position k in the input sequence upstream from the interleaving (y(k)=x(L(k))).

The relationship #1 is written $L_{TL}(k)=I_{p,q}^{(j)}(k)$.

It depends on three integer parameters (p,q,j) corresponding to iterating a base algorithm I and on the interleaving block size K.

$L_{TL}(k)=I_{p,q}^{(j)}(k)$ is described by the following equation:

$$L_{TL}(k)=I_{p,q}^{(j)}(k)=[K-p+k+q\cdot p\cdot [-k-p\cdot I_{p,q}^{(j-1)}(k)]_K]_K$$

$$j=1 \rightarrow L_{TL}(k)=I_{p,q}(k)=[K-p+k+q\cdot p\cdot[-k-p\cdot k]_K]_K$$

$$k=\{0,\ldots,K-1\}, j>0$$

The dispersion of an interleaving algorithm L(k) corresponding to the minimum distance between the position indices of interleaved samples separated by s−1 samples is expressed in the form:

$$\Delta L(s)=\text{Median}|L(k)-L(k+s)|, \text{ i.e.}$$

$$\Delta L(s)=\text{Min}_k\{|L(k+s)-L(k)|, K-|L(k+s)-L(k)|\}$$

$$\Delta L(s)=\text{Median}\{|L(k+s)-L(k)|\}$$

For the algorithm TL, the dispersion is calculated algebraically by giving consideration to the median value of equation (3) when all of the values of k have scanned over the range 0 to K−1.

$$L_{TL}(k)=I_{p,q}^{(j)}(k)=[K-p+k+q\cdot p\cdot I_{p,q}^{(j-1)}(k)]_K \quad k=\{0,\ldots,K-1\}$$

$$L_{TL}(k+s)=I_{p,q}^{(j)}(k+s)=[K-p+k+s+q\cdot p\cdot I_{p,q}^{(j-1)}(k+s)]_K$$

$$P_{j,p,q}(k,s)=L_{TL}(k+s)-L_{TL}(k)$$

$$P_{j,p,q}(k,s)=s-[q\cdot p\cdot (s+p\cdot P_{j-1,p,q}(k,s))]_K (j>1)$$

$$\Delta L_{TL}(s)=\underset{0\le k\le K-1}{\text{Min}}\{|P_{j,p,q}(k,s)|, K-|P_{j,p,q}(k,s)|\}$$

$$\Delta L_{TL}(s)=\underset{0\le k\le K-1}{\text{Min}}\begin{cases}|s-[q\cdot p\cdot(s+p\cdot P_{j-1,p,q}(k,s))]_K|, \\ K-|s-[q\cdot p\cdot(s+p\cdot P_{j-1,p,q}(k,s))]_K|\end{cases}$$

$$j=1$$

$$P_{1,p,q}(k,s)=s-[q\cdot p\cdot s(p+1)]_K$$

$$\Delta L_{TL}(s)=\underset{0\le k\le K-1}{\text{Min}}\{|[s-q\cdot p\cdot s(1+p)]_K|, K-|[s-q\cdot p\cdot s(1+p)]_K|\}$$

The interleaving relationship applies to a block of size $K=N_{SD}=736$. It is optimized by selecting the parameters {p', q',j'}={4,2,2} which provides an optimized dispersion for small values of s.

FIG. 17 shows the dispersion $\Delta L(s)$ for different values of s. The values of s that are sub-multiples of K, i.e. $[K]_s=0$, that present a dispersion $\Delta L(s)$ greater than the harmonic mean MH of the dispersion calculated over K/2 samples are values that may be taken into consideration for the sub-channel size $N_{SDC}^{(u)}$, and they are ringed in FIG. 17. In FIG. 17, there can be seen the harmonic mean MH (=56) as a continuous line and the median value ME (=183) as a dashed line for the dispersion as calculated over K/2 samples.

Simulations in the physical layer (PHY) show that the harmonic mean MH is a parameter that is more pertinent for selecting the size of the sub-channels than is the median value ME for the system configuration under consideration. The method is shown more precisely by considering two values of s that lead to a small dispersion (s'=16,32) and two values of s that lead to a maximum dispersion (s'=8,46).

If $\Delta L(s)$ is less than the harmonic mean MH, then symbol interleaving patterns are observed without diversity between sub-channels, the similarities between patterns amongst sub-channels are large, as shown in FIGS. 18 and 12 which correspond respectively to selecting s'=16 giving a sub-channel number $N_{SC}=46$, and to selecting s'=32, giving a sub-channel number $N_{SC}=23$.

If $\Delta L(s)$ is greater than the harmonic mean MH, then symbol interleaving patterns are observed with diversity between sub-channels, the pattern differences between sub-channels are large, as shown in FIGS. 15 and 19, which correspond respectively to selecting s'=23, giving a channel number $N_{SC}=32$, and to selecting s'=46, giving a channel number $N_{SC}=16$.

A sub-channel size $N_{SDC}$ greater than MH provides equivalent similar performance, whereas a value below the threshold MH leads to a degradation in performance since it leads to performance variation in terms of binary error rate (BER). Table 3 in Appendix A gives the dispersion parameters for the above four values of s', i.e. 16, 23, 32, and 46, in association with relationship #1.

Pre-selecting the value s to be equal to eight leads to patterns that are identical between sub-channels one and three. Consequently, the method can evaluate interleaving pattern diversity not only between two adjacent sub-channels, but also between two sub-channels that are separated by one sub-channel, or indeed that are separated by more than one sub-channel in order to set aside pre-selected values for s' that satisfy an amplitude criterion for dispersion, that satisfy the criterion for geometrical diversity between adjacent sub-channels, but that do not satisfy the criterion for geometrical diversity between sub-channels that are separated by one sub-channel.

The second example relates to a system SYSa for which the interleaver ETS implements an interleaving relationship RP deduced from Crozier's algorithm as described in the article by S. Crozier et al.: "High-performance low-memory interleaver banks for turbo-codes", IEEE VTC FALL 2001, Vol. 1 of 4, conf. 54 Oct. 7, 2001, pp. 2394-2398, XP010562400, ISBN:0-7803-7005-8.

Crozier's law is such that the parameter $p_c$ is the parameter that provides the dispersion for s=1 of the interleaving relationship referred to herein as the carrier allocation relationship. The scattering pattern is such that the maximum dispersion depends explicitly on the values of s.

The interleaving relationship $L_{RP}(k)$ is given by:

$$L_{RP}(k)=[s_c+k \cdot p_c]_K \quad k=\{0,\ldots,K-1\}$$

$$|L_{RP}(k+1)-L_{RP}(k)|=p_c$$

The operation $[X]_K$ corresponding to the modulo K operation applied to X, i.e.:

$$[X]_K = X - E\left(\frac{X}{K}\right) \cdot K$$

The dispersion $\Delta L_{RP}(s)$ is given by:

$$L_{RP}(k)=[s_c+k \cdot p_c]_K \quad k=\{0,\ldots,K-1\}$$

$$|L_{RP}(k+s)-L_{RP}(k)|=|[p_c \cdot s]_K|$$

$$\Delta L_{RP}(s)=\text{Min}\{|[p_c \cdot s]_K|, K-|[p_c \cdot s]_K|\}$$

Table 4 in Appendix A provides the values of the dispersion parameters for relationship #2:
the dispersion $\Delta L_{RP}(s)$ for remarkable values of $s=N_{SDC}$;
the mean intra-sub-channel dispersion $\Delta L_{DM}^{int}(N_{SDC})$ corresponds to the mean of the dispersion calculated for values of s varying over the range 0 to $N_{SDC}-1$;
the mean inter-channel dispersion $\Delta L_{DM}^{S_c^0}(N_{SDC})$ corresponds to the dispersion between four sub-channels for a given position index between channels; and
the geometrical diversity dispersion as described above.

Figure 20:
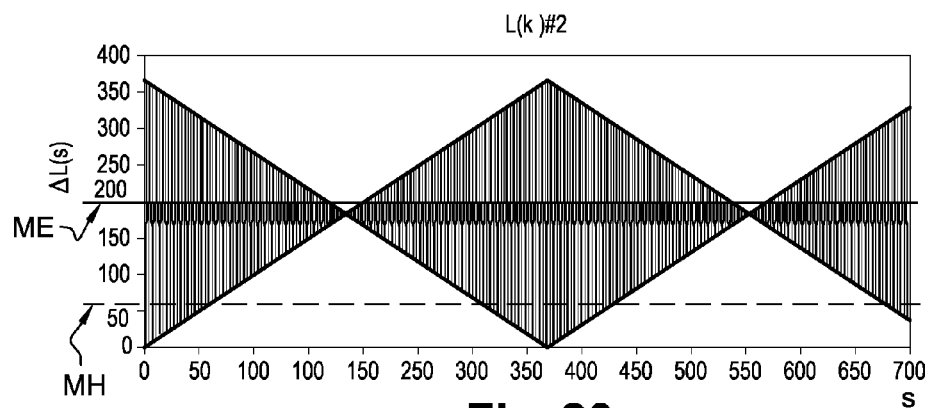
FIG. 20 is a graph obtained with an OFDM transceiver according to a first implementation.
Figure 21:
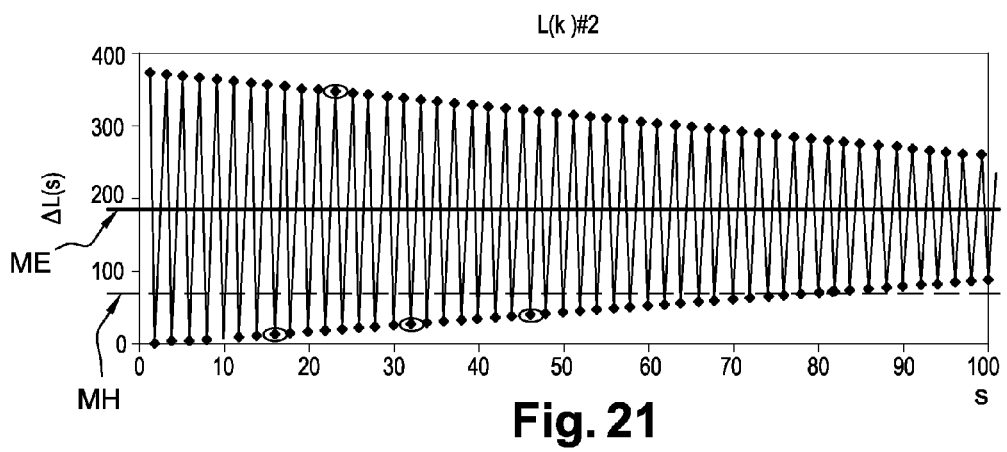
FIG. 21 is a graph obtained with an OFDM transceiver according to a second implementation.

The dispersion $\Delta L_{RP}(s)$ is shown in FIGS. 20 and 21. The value s=23 is the value selected as the channel size that provides an adequate dispersion between sub-channels.

A method of the invention may be implemented by various means. For example, the method may be implemented in hardware form, in software form, or by a combination of both.

For a hardware implementation, the mapping module for executing the various steps at the transmitter may be incorporated in one or more application specific integrated circuits (ASICs), in digital signal processors (DSPs), digital signal processing devices (DSPDs), in programmable logic devices (PLDs), in FPGAs, in controllers, microcontrollers, microprocessors, or any other electronic component designed to execute the steps of the above-described method. The same applies to the various modules of the transmitter, in particular the modulator, the frequency interleaver, and the multi-carrier modulator.

In a software implementation, some or all of the steps of a mapping method may be implemented by modules that execute the above-described steps. The software code may be stored in a memory and executed by a processor. The memory may form part of the processor or may be external to the processor and coupled thereto by means known to the person skilled in the art.

Consequently, the invention also provides a computer program, in particular a computer program on or in an information medium or memory and that is adapted to implement the invention. The program may make use of any programming language, and may be in the form of source code, object code, or code intermediate between source code and object code, such as in a partially compiled form, or in any other form that is desirable for implementing a method of the invention.

The information medium may be any entity or device capable of storing the program. For example, the medium may comprise storage means, such as a read-only memory (ROM), e.g. a compact disk (CD) ROM, or a microelectronic circuit ROM, an electrically erasable programmable ROM (EEPROM), a random access memory (RAM), or indeed magnetic recording means, e.g. a floppy disk or a hard disk. Alternatively, the information medium may be an integrated circuit in which the program is incorporated, the circuit being adapted to execute or to be used in the execution of the method in question.

Furthermore, the information medium may be a transmissible medium such as an electrical or optical signal, suitable for being conveyed via an electrical or optical cable, by radio, or by other means. The program of the invention may in particular be downloaded from an Internet type network.

In a preferred implementation, the steps of the mapping method are determined by the instructions of a transmission program incorporated in an electronic circuit such as a chip that is itself suitable for being arranged in an electronic device such as a transmitter of a base station, such as any wireless network equipment, or such a station suitable for communicating with a wireless network via a base station (such as a mobile terminal). The mapping method of the invention may also be implemented when the program is loaded in a calculation member such as a processor or the equivalent with the operation thereof then being controlled by execution of the program.

APPENDIX A

TABLE 1

DL FUSC Wimax

| FTT Size | $N_{SD}$ | Nused | Nsc | $N_{SDC}$ | Permutation DL-Perm_base |
|---|---|---|---|---|---|
| 2048 | 1536 | | 32 | 48 | 3, 18, 2, 8, 16, 10, 11, 15, 26, 22, 6, 9, 27, 20, 25, 1, 29, 7, 21, 5, 28, 31, 23, 17, 4, 24, 0, 13, 12, 19, 14, 30 |
| 1024 | 768 | 851 | 16 | 48 | 6, 14, 2, 3, 10, 8, 11, 15, 9, 1, 13, 12, 5, 7, 4, 0 |
| 512 | 384 | 427 | 8 | 48 | 2, 0, 1, 6, 4, 3, 5, 7 |
| 128 | 96 | 107 | 2 | 48 | 1, 0 |

TABLE 2

DL PUSC Wimax

| FTT size | $N_{SD}$ | Nused (with pilots + DC carrier) | Nsc | $N_{SDC}$ | Nclusters | symbols/cluster |
|---|---|---|---|---|---|---|
| 2048 | 1440 | 1681 | 60 | 24 | 120 | 14 |
| 512 | 360 | 421 | 15 | 24 | 30 | 14 |

TABLE 3

| s' | Nsc | $\Delta L\ (s=s')$ | $\Delta L_{DM}^{int}(s')$ | $\Delta L_{DM}^{Sc^0}(s')$ | $\Delta L_{DM}(s')$ |
|---|---|---|---|---|---|
| 46 | 16 | 322 | 187 | 207 | 186 |
| 16 | 46 | 16 | 184 | 40 | 178 |
| 32 | 23 | 32 | 184 | 80 | 181 |
| 23 | 32 | 161 | 177 | 207 | 186 |

TABLE 4

| s' | Nsc | $\Delta L\ (s=s')$ | $\Delta L_{DM}^{int}(s')$ | $\Delta L_{DM}^{Sc^0}(s')$ | $\Delta L_{DM}(s')$ |
|---|---|---|---|---|---|
| 46 | 16 | 46 | 183.5 | 115 | 182.5 |
| 16 | 46 | 16 | 183.5 | 40 | 181.6 |
| 32 | 23 | 32 | 183.5 | 80 | 183 |
| 23 | 32 | 345 | 176.45 | 195.5 | 183.5 |

The invention claimed is:

1. A method of mapping data symbols at the input of a multi-carrier modulator, which data symbols are interleaved in blocks of K data symbols, into sub-channels, each of size equal to $N_{SDC}$ consecutive carriers scattered to one or more multi-carrier symbols, $N_{SDC}$ being a sub-multiple of the number of data symbols per block K, wherein the size $N_{SDC}$ of the sub-channels is determined as a function of a data symbol interleaving pattern diversity evaluated by a geometrical diversity criterion that includes quantifying interleaving dispersion within a sub-channel and between sub-channels.

2. The method of mapping at the input of a multi-carrier modulator according to claim 1, wherein the data symbol interleaving pattern diversity between sub-channels is evaluated for groups of sub-channels that are spaced apart by no more than one sub-channel.

3. The method of mapping at the input of a multi-carrier modulator according to claim 2, wherein the groups are made up of pairs of adjacent sub-channels.

4. The method of mapping at the input of a multi-carrier modulator according to claim 1, comprising:
a first step of calculating a dispersion function $\Delta L(s)$ representing the minimum distance between the data symbols as a function of the difference s between interleaved data symbols for a given interleaving relationship L(k);
second step of pre-selecting different values of s, sub-multiples of K, for which the dispersion values satisfy an amplitude criterion; and
a third step of evaluating the geometrical diversity criterion for the different pre-selected values, the size $N_{SDC}$ of the sub-channels being determined to be equal to one of the pre-selected values for which the geometrical diversity criterion is at a maximum.

5. The method of mapping at the input of a multi-carrier modulator according to claim 1, wherein K is equal to the size of a multi-carrier symbol.

6. The method of mapping at the input of a multi-carrier modulator according to claim 1, wherein K is a multiple of the size of a multi-carrier symbol.

7. A processor configured to map data symbols at the input of a multi-carrier modulator, which data symbols are interleaved in blocks of K data symbols, into sub-channels each of size equal to $N_{SDC}$ consecutive carriers scattered over one or more multi-carrier symbols, where $N_{SDC}$ is a sub-multiple of K, it is also adapted to determine a sub-channel size as a function of a data symbol interleaving pattern diversity evaluated utilizing a geometrical diversity criterion that includes quantifying interleaving dispersion within a sub-channel and between sub-channels.

8. A transmitter of a multi-carrier signal, the transmitter comprising, between a modulator generating data symbols and a multi-carrier modulator generating multi-carrier symbols, an interleaver for interleaving a block of K data symbols, the transmitter being adapted in that it includes the processor according to claim 7.

9. A system for transmitting a multi-carrier signal, the system comprising a transmitter and a receiver, and being adapted in that the transmitter is according to claim 8.

10. An information medium comprising program instructions adapted to implement the method of mapping data symbols at the input of a multi-carrier modulator, which data symbols are interleaved in blocks of K data symbols, according to claim 1, when said program is loaded and executed in a multi-carrier signal transmitter device.

11. A non-transitory computer program product that is directly loadable into the internal memory of a multi-carrier signal transmitter device, the product comprising software code portions for executing steps of the method of mapping data symbols at the input of a multi-carrier modulator, which data symbols are interleaved in blocks of K data symbols, according to claim 1, when the program is executed by a multi-carrier signal transmitter device.

12. A method of mapping data symbols at the input of a multi-carrier modulator, which data symbols are interleaved in blocks of K data symbols, into sub-channels each of size equal to $N_{SDC}$ consecutive carriers scattered to one or more multi-carrier symbols, $N_{SDC}$ being a sub-multiple of the number of data symbols per block K, wherein the size $N_{SDC}$ of the sub-channels is determined as a function of a data symbol interleaving pattern diversity evaluated utilizing a geometrical diversity criterion that includes quantifying interleaving dispersion within a sub-channel and between sub-channels, the method comprising:
a first step of calculating a dispersion function $\Delta L(s)$ representing the minimum distance between the data symbols as a function of the difference s between interleaved data symbols for a given interleaving relationship L(k);
second step of pre-selecting different values of s, sub-multiples of K, for which the dispersion values satisfy an amplitude criterion; and
a third step of evaluating the geometrical diversity criterion for the different pre-selected values, the size $N_{SDC}$ of the sub-channels being determined to be equal to one of the pre-selected values for which the geometrical diversity criterion is at a maximum.

13. The method of mapping at the input of a multi-carrier modulator according to claim 12, wherein the data symbol interleaving pattern diversity between sub-channels is evaluated for groups of sub-channels that are spaced apart by no more than one sub-channel.

14. The method of mapping at the input of a multi-carrier modulator according to claim 13, wherein the groups are made up of pairs of adjacent sub-channels.

15. The method of mapping at the input of a multi-carrier modulator according to claim 12, wherein K is equal to the size of a multi-carrier symbol.

16. The method of mapping at the input of a multi-carrier modulator according to claim 12, wherein K is a multiple of the size of a multi-carrier symbol.

17. A processor configured to map data symbols at the input of a multi-carrier modulator, which data symbols are interleaved in blocks of K data symbols, into sub-channels each of size equal to $N_{SDC}$ consecutive carriers scattered over one or more multi-carrier symbols, where $N_{SDC}$ is a sub-multiple of K, it is also adapted to determine a sub-channel size as a function of a data symbol interleaving pattern diversity evaluated utilizing a geometrical diversity criterion that includes quantifying interleaving dispersion within a sub-channel and between sub-channels,
- by calculating a dispersion function $\Delta L(s)$ representing the minimum distance between the data symbols as a function of the difference s between interleaved symbols for a given interleaving relationship $L(k)$;
- by pre-selecting different values of s, sub-multiples of K, for which the dispersion values satisfy an amplitude criterion; and
- by evaluating the geometrical diversity criterion for the different pre-selected values, the size $N_{SDC}$ of the sub-channels being determined to be equal to one of the pre-selected values for which the geometrical diversity criterion is at a maximum.

\* \* \* \* \*